United States Patent
Choi et al.

(10) Patent No.: US 10,645,393 B2
(45) Date of Patent: May 5, 2020

(54) IMAGE ENCODING METHOD AND DEVICE FOR SAMPLE VALUE COMPENSATION AND IMAGE DECODING METHOD AND DEVICE FOR SAMPLE VALUE COMPENSATION

(71) Applicant: SAMSUNG ELECTRONICS CO., LTD., Suwon-si (KR)

(72) Inventors: Ki-ho Choi, Seoul (KR); Chan-yul Kim, Bucheon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 15/572,638

(22) PCT Filed: Oct. 16, 2015

(86) PCT No.: PCT/KR2015/010957
§ 371 (c)(1),
(2) Date: Nov. 8, 2017

(87) PCT Pub. No.: WO2016/182142
PCT Pub. Date: Nov. 17, 2016

(65) Prior Publication Data
US 2018/0139449 A1    May 17, 2018

Related U.S. Application Data

(60) Provisional application No. 62/160,300, filed on May 12, 2015.

(51) Int. Cl.
*H04N 19/14* (2014.01)
*H04N 19/82* (2014.01)
(Continued)

(52) U.S. Cl.
CPC .......... *H04N 19/14* (2014.11); *H04N 19/107* (2014.11); *H04N 19/117* (2014.11);
(Continued)

(58) Field of Classification Search
None
See application file for complete search history.

(56) References Cited

U.S. PATENT DOCUMENTS

2012/0213276 A1    8/2012   Hagai et al.
2012/0236936 A1    9/2012   Segall et al.
(Continued)

FOREIGN PATENT DOCUMENTS

JP    8-18957 A       1/1996
JP    2002-223445 A   8/2002
(Continued)

OTHER PUBLICATIONS

Fu, et al., "Sample Adaptive Offset in the HEVC Standard", Dec. 2012, IEEE Transactions on Circuits and Systems for Video Technology, vol. 22, Issue No. 12, pp. 1755-1764.
(Continued)

*Primary Examiner* — Christopher Braniff
(74) *Attorney, Agent, or Firm* — Sughrue Mion, PLLC

(57) ABSTRACT

Provided are a video encoding method and apparatus and a video decoding method and apparatus for producing a reconstructed video having a minimum error with respect to an original video. The video decoding method includes parsing an edge correction parameter from a bitstream, the edge correction parameter being used to correct a reconstructed pixel included in a current block, determining whether the reconstructed pixel is included in an edge region according to a first threshold value included in the edge correction parameter, determining whether the reconstructed pixel is to be corrected according to a second threshold value included in the edge correction parameter when the reconstructed pixel is included in the edge region, and compensating for a sample value of the reconstructed pixel accord-
(Continued)

ing to a third threshold value included in the edge correction parameter when the reconstructed pixel is to be corrected.

18 Claims, 16 Drawing Sheets

(51) Int. Cl.
  *H04N 19/184* (2014.01)
  *H04N 19/182* (2014.01)
  *H04N 19/117* (2014.01)
  *H04N 19/107* (2014.01)
  *H04N 19/50* (2014.01)

(52) U.S. Cl.
  CPC ......... *H04N 19/182* (2014.11); *H04N 19/184* (2014.11); *H04N 19/82* (2014.11); *H04N 19/50* (2014.11)

(56) References Cited

U.S. PATENT DOCUMENTS

| | | |
|---|---|---|
| 2014/0153636 A1 | 6/2014 | Esenlik et al. |
| 2014/0192869 A1* | 7/2014 | Laroche ............... H04N 19/176 375/240.12 |
| 2014/0192904 A1 | 7/2014 | Rosewarne |
| 2014/0348222 A1 | 11/2014 | Hsiang et al. |
| 2014/0369613 A1 | 12/2014 | Avadhanam et al. |

FOREIGN PATENT DOCUMENTS

| | | |
|---|---|---|
| JP | 2003-179933 A | 6/2003 |
| KR | 10-2015-0034683 A | 4/2015 |
| WO | 81/03096 A1 | 2/1981 |
| WO | 81/03096 | 10/1981 |
| WO | 2005/117447 A2 | 12/2005 |
| WO | 2014/052602 A1 | 4/2014 |
| WO | WO2014052602 * | 4/2014 |

OTHER PUBLICATIONS

Search Report dated Feb. 4, 2016, issued by the International Searching Authority in counterpart International Patent Application No. PCT/KR2015010957 (PCT/ISA/210).

Written Opinion dated Feb. 4, 2016, issued by the International Searching Authority in counterpart International Patent Application No. PCT/KR2015010957 (PCT/ISA/237).

Communication dated Feb. 6, 2018 by the European Patent Office in counterpart European Patent Application No. 15891958.9.

Communication dated Oct. 1, 2019, issued by the Japanese Patent Office in counterpart Japanese Application No. 2017-558701.

Communication dated Dec. 4, 2019, issued by the State Intellectual Property Office of the People's Republic of China in Chinese Patent Application No. 201580081670.3.

* cited by examiner

<DETERMINE WHETHER PIXEL HAS EDGE>
RELATION EXPRESSION (1):
  Max(Diff(E0), Diff(E45), Diff(E90), Diff(E135)) > T1

Diff(E0) : abs((105−115) − (105 − 105))= 10 — 611
Diff(E45): abs((105−115) − (105 − 105))= 10 — 612
Diff(E90): abs((105−105) − (105 − 105))= 0 — 613
Diff(E135): abs((105−105) − (105 − 115))= 10 — 614

<DETERMINE WHETHER PIXEL IS TO BE CORRECTED>

RELATION EXPRESSION (2) : If(abs(Pixel − Mean) > T2)

FIG. 6C

<CORRECT PIXEL>

(a)

| 115 | 105 | 105 |
|-----|-----|-----|
| 115 | 104 | 105 |
| 115 | 105 | 105 |

RELATION EXPRESSION (4):
If (abs(Pixel − Mean) > T3) → −1 or +1

(b)

| 115 | 105 | 105 |
|-----|-----|-----|
| 115 | 103 | 105 |
| 115 | 105 | 105 |

RELATION EXPRESSION (4):
If (abs(Pixel − Mean) > T4) → −2 or +2

(c)

| 115 | 105 | 105 |
|-----|-----|-----|
| 115 | 102 | 105 |
| 115 | 105 | 105 |

RELATION EXPRESSION (5):
If (abs(Pixel − Mean) > T5) → −3 or +3

(a-1)　　　　　　　　　(a-2)

(b-1)　　　　　　　　　(b-2)

CODING UNIT (1010)

PREDICTION UNIT (1060)

IMAGE ENCODING METHOD AND DEVICE FOR SAMPLE VALUE COMPENSATION AND IMAGE DECODING METHOD AND DEVICE FOR SAMPLE VALUE COMPENSATION

TECHNICAL FIELD

The present disclosure relates to encoding and decoding a video.

BACKGROUND ART

As hardware for reproducing and storing high resolution or high quality video content is being developed and supplied, a need for a video codec for effectively encoding or decoding the high resolution or high quality video content is increasing. According to a conventional video codec, a video is encoded according to a limited encoding method based on a block of a predetermined size.

Image data of a spatial region is transformed into coefficients of a frequency region via frequency transformation. According to a video codec, an image is split into blocks having a predetermined size, discrete cosine transformation (DCT) is performed on each block, and frequency coefficients are encoded in block units, for rapid calculation of frequency transformation. Compared with image data of a spatial region, coefficients of a frequency region are easily compressed. In particular, since an image pixel value of a spatial region is expressed according to a prediction error via inter prediction or intra prediction of a video codec, when frequency transformation is performed on the prediction error, a large amount of data may be transformed to 0. According to a video codec, an amount of data may be reduced by replacing data that is consecutively and repeatedly generated with small-sized data.

DETAILED DESCRIPTION OF THE INVENTION

Technical Problem

The present disclosure suggests a video encoding method and apparatus and a video decoding method and apparatus for producing a reconstructed video having a minimum error with respect to an original video at a high bit depth and a high bit rate.

Technical Solution

A method of decoding a video, according to an embodiment of the present disclosure, includes parsing an edge correction parameter from a bitstream, the edge correction parameter being used to correct a reconstructed pixel included in a current block; determining whether the reconstructed pixel is included in an edge region according to a first threshold value included in the edge correction parameter; determining whether the reconstructed pixel is to be corrected according to a second threshold value included in the edge correction parameter when the reconstructed pixel is included in the edge region; and compensating for a sample value of the reconstructed pixel according to a third threshold value included in the edge correction parameter when the reconstructed pixel is to be corrected.

An apparatus for decoding a video according to an embodiment of the present disclosure includes a parameter extractor configured to parse an edge correction parameter from a bitstream, the edge correction parameter being used to correct a reconstructed pixel included in a current block; and an edge corrector configured to determine whether the reconstructed pixel is included in an edge region according to a first threshold value included in the edge correction parameter, determine whether the reconstructed pixel is to be corrected according to a second threshold value included in the edge correction parameter when the reconstructed pixel is included in the edge region, and compensate for a sample value of the reconstructed pixel according to a third threshold value included in the edge correction parameter when the reconstructed pixel is to be corrected.

Advantageous Effects of the Invention

In video decoding apparatuses according to various embodiments of the present disclosure, a reconstructed video having a minimum error in an edge region with respect to an original video may be produced by generating reconstructed pixels for each of decoded video blocks and adjusting sample values of the reconstructed pixels by using an edge correction parameter parsed from a bitstream.

DESCRIPTION OF THE DRAWINGS

FIGS. 6A to 6C illustrate a process of correcting a reconstructed pixel included in a current block, according to an embodiment.

BEST MODE

Figure 1:
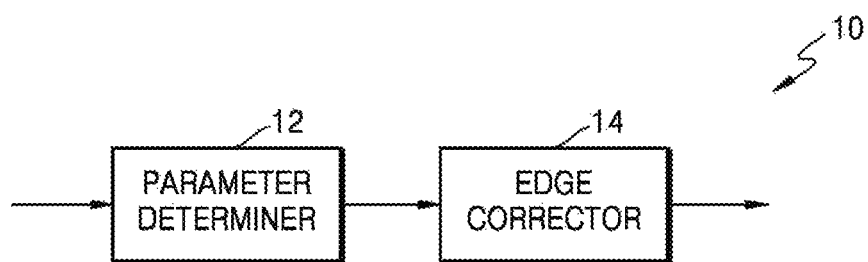
FIG. 1 is a block diagram of a video encoding apparatus according to an embodiment.

A method of decoding a video according to an embodiment includes parsing an edge correction parameter from a bitstream, the edge correction parameter being used to correct a reconstructed pixel included in a current block; determining whether the reconstructed pixel is included in an edge region according to a first threshold value included in the edge correction parameter; determining whether the reconstructed pixel is to be corrected according to a second threshold value included in the edge correction parameter when the reconstructed pixel is included in the edge region; and compensating for a sample value of the reconstructed pixel according to a third threshold value included in the edge correction parameter when the reconstructed pixel is to be corrected.

At least two values among the first threshold value, the second threshold value and the third threshold value may be the same value.

The parsing of the edge correction parameter from the bitstream may include parsing the edge correction parameter from a slice segment header of the bitstream.

The method may further include parsing an edge correction flag indicating whether edge correction is to be performed on the current block; and parsing an effect type flag indicating a type of an edge correction effect of the current block, based on the parsed edge correction flag.

The method may further include parsing an effect type flag indicating a type of an edge correction effect of the current block. The compensating for the sample value of the reconstructed pixel according to the third threshold value included in the edge correction parameter may include parsing the sample value of the reconstructed pixel according to the third threshold value related to the parsed effect type flag.

When the effect type flag indicates application of a smoothing effect to the current block, the sample value of the reconstructed pixel may be compensated for to reduce a difference between the sample value of the reconstructed pixel and sample values of neighboring pixels of the reconstructed pixel.

When the effect type flag indicates application of a sharpening effect to the current block, the sample value of the reconstructed pixel may be compensated for to increase a difference between the sample value of the reconstructed pixel and sample values of neighboring pixels of the reconstructed pixel.

The determining of whether the reconstructed pixel is included in the edge region according to the first threshold value included in the edge correction parameter may include determining that the reconstructed pixel is included in the edge region when a difference between the sample value of the reconstructed pixel and a sample value of at least one neighboring pixel of the reconstructed pixel is greater than or equal to the first threshold value.

The determining of whether the reconstructed pixel is to be corrected according to the second threshold value included in the edge correction parameter may include determining that the reconstructed pixel is to be corrected when a difference between the sample value of the reconstructed pixel and a mean of a sample value of at least one neighboring pixel of the reconstructed pixel is greater than or equal to the second threshold value.

The compensating for the sample value of the reconstructed pixel according to the third threshold value included in the edge correction parameter may include increasing or decreasing the sample value of the reconstructed pixel when a difference between the sample value of the reconstructed pixel and a mean of a sample value of at least one neighboring pixel of the reconstructed pixel is greater than or equal to the third threshold value.

The edge correction parameter may include at least one of a parameter for a luma component and a parameter for a chroma component.

An apparatus for decoding a video according to an embodiment of the present disclosure includes a parameter extractor configured to parse an edge correction parameter from a bitstream, the edge correction parameter being used to correct a reconstructed pixel included in a current block; and an edge corrector configured to determine whether the reconstructed pixel is included in an edge region according to a first threshold value included in the edge correction parameter, determine whether the reconstructed pixel is to be corrected according to a second threshold value included in the edge correction parameter when the reconstructed pixel is included in the edge region, and compensate for a sample value of the reconstructed pixel according to a third threshold value included in the edge correction parameter when the reconstructed pixel is to be corrected.

At least two values among the first threshold value, the second threshold value and the third threshold value may be the same value.

The parameter extractor may parse an edge correction flag indicating whether edge correction is to be performed on the current block, and parse an effect type flag indicating a type of an edge correction effect of the current block, based on the parsed edge correction flag.

The parameter extractor may parse an effect type flag indicating a type of an edge correction effect of the current block, and parse the sample value of the reconstructed pixel according to the third threshold value included in the edge correction parameter related to the parsed effect type flag.

When whether the reconstructed pixel is included in the edge region is determined according to the first threshold value included in the edge correction parameter, the edge corrector may determine that the reconstructed pixel is included in the edge region when a difference between the sample value of the reconstructed pixel and a sample value of at least one neighboring pixel of the reconstructed pixel is greater than or equal to the first threshold value.

When whether the reconstructed pixel is to be corrected is determined according to the second threshold value included in the edge correction parameter, the edge corrector may determine that the reconstructed pixel is to be corrected when a difference between the sample value of the reconstructed pixel and a mean of a sample value of at least one neighboring pixel of the reconstructed pixel is greater than or equal to the second threshold value.

When the sample value of the reconstructed pixel is compensated for according to the third threshold value included in the edge correction parameter, the sample value of the reconstructed pixel may be increased or decreased when a difference between the sample value of the reconstructed pixel and a mean of a sample value of at least one neighboring pixel of the reconstructed pixel is greater than or equal to the third threshold value.

A method of encoding a video according to an embodiment includes determining an edge correction parameter for correcting a reconstructed pixel included in a current block; determining whether the reconstructed pixel is included in an edge region according to a first threshold value included in the edge correction parameter; determining whether the reconstructed pixel is to be corrected according to a second threshold value included in the edge correction parameter when the reconstructed pixel is included in the edge region; and compensating for a sample value of the reconstructed pixel according to a third threshold value included in the edge correction parameter when the reconstructed pixel is to be corrected.

At least two values among the first threshold value, the second threshold value and the third threshold value may be the same value.

The method may further include determining an effect type flag indicating a type of an edge correction effect of the current block. The compensating for the sample value of the reconstructed pixel according to the third threshold value included in the edge correction parameter may include compensating for the sample value of the reconstructed pixel according to the third threshold value included in the edge correction parameter related to the determined effect type flag.

The determining of whether the reconstructed pixel is included in the edge region according to the first threshold value included in the edge correction parameter may include determining that the reconstructed pixel is included in the edge region when a difference between the sample value of the reconstructed pixel and a sample value of at least one neighboring pixel of the reconstructed pixel is greater than or equal to the first threshold value.

The determining of whether the reconstructed pixel is to be corrected according to the second threshold value included in the edge correction parameter may include determining that the reconstructed pixel is to be corrected when a difference between the sample value of the reconstructed pixel and a mean of a sample value of at least one neighboring pixel of the reconstructed pixel is greater than or equal to the second threshold value.

The compensating for the sample value of the reconstructed pixel according to the third threshold value included in the edge correction parameter may include increasing or decreasing the sample value of the reconstructed pixel when a difference between the sample value of the reconstructed pixel and a mean of a sample value of at least one neighboring pixel of the reconstructed pixel is greater than or equal to the third threshold value.

An apparatus for encoding a video according to an embodiment includes a parameter determiner configured to determine an edge correction parameter for correcting a reconstructed pixel included in a current block; and an edge corrector configured to determine whether the reconstructed pixel is included in an edge region according to a first threshold value included in the edge correction parameter, determine whether the reconstructed pixel is to be corrected according to a second threshold value included in the edge correction parameter when the reconstructed pixel is included in the edge region, and compensate for a sample value of the reconstructed pixel according to a third threshold value included in the edge correction parameter when the reconstructed pixel is to be corrected.

At least two values among the first threshold value, the second threshold value and the third threshold value may be the same value.

When whether the reconstructed pixel is included in the edge region is determined according to the first threshold value included in the edge correction parameter, the edge corrector may determine that the reconstructed pixel is included in the edge region when a difference between the sample value of the reconstructed pixel and a sample value of at least one neighboring pixel of the reconstructed pixel is greater than or equal to the first threshold value.

When whether the reconstructed pixel is to be corrected is determined according to the second threshold value included in the edge correction parameter, the edge corrector may determine that the reconstructed pixel is to be corrected when a difference between the sample value of the reconstructed pixel and a mean of a sample value of at least one neighboring pixel of the reconstructed pixel is greater than or equal to the second threshold value.

When the sample value of the reconstructed pixel is compensated for according to the third threshold value included in the edge correction parameter, the edge corrector may increase or decrease the sample value of the reconstructed pixel when a difference between the sample value of the reconstructed pixel and a mean of a sample value of at least one neighboring pixel of the reconstructed pixel is greater than or equal to the third threshold value.

A program for implementing a method of decoding a video and a method of encoding a video according to an embodiment may be recorded on a computer-readable recording medium.

MODE OF THE INVENTION

Hereinafter, a video encoding technique and a video decoding technique for correcting an error in an edge region of a video according to an embodiment will be described with reference to FIGS. 1 to 7. Furthermore, in a video encoding technique and a video decoding technique based on coding units of a tree structure according to an embodiment, correcting an error in an edge region of a video according to an embodiment will be described with reference to FIGS. 1 to 20. Hereinafter, an 'image' may indicate a still image of a video or a moving picture, i.e., the video itself.

First, a video encoding technique and a video decoding technique for correcting an error in an edge region of a video according to an embodiment will be described with reference to FIGS. 1 to 7.

FIG. 1 is a block diagram of a video encoding apparatus 10 according to an embodiment.

In an embodiment, the video encoding apparatus 10 includes a parameter determiner 12 and an edge corrector 14.

In an embodiment, the video encoding apparatus 10 receives images of a video, splits each of the images into blocks, and encodes each of the blocks. Each of the blocks may be a square or rectangular type block or may have any geometric shape. Each of the blocks is not limited to a predetermined sized data unit. In an embodiment, a block may include coding units according to a tree structure. For example, the coding units according to the tree structure may include a largest coding unit (LCU) and coding units (CUs). Video encoding and decoding methods based on coding units according to a tree structure will be described with reference to FIGS. 8 to 20 below.

In an embodiment, the video encoding apparatus 10 may receive images of a video, split each of the images into largest coding units, and output, in the form of a bitstream, data obtained by performing prediction, transformation, and entropy coding on samples of each of the largest coding units. The samples of the largest coding unit may be data of sample values of pixels included in the largest coding unit.

In an embodiment, the video encoding apparatus 10 may encode the images on the basis of blocks of a tree structure. Alternatively, the video encoding apparatus 10 may individually encode largest coding units of images included in blocks of a tree structure. In an embodiment, the video encoding apparatus 10 may encode a current largest coding unit on the basis of coding units of a tree structure split from the current largest coding unit.

In an embodiment, in order to encode the current largest coding unit, the video encoding apparatus 10 may encode samples by performing intra-prediction, inter-prediction, transformation, and quantization on coding units of a tree structure included in a current coding unit.

In an embodiment, the video encoding apparatus 10 may reconstruct samples included in a current block by performing inverse quantization, inverse transformation, inter-prediction, or intra-prediction on blocks of a tree structure of the encoded samples.

In this case, an error may occur between an edge region of an original image and an edge region of a reconstructed image obtained by decoding a result of encoding the original image.

In order to minimize an error between reconstructed pixels and original pixels in an edge region, the parameter determiner 12 may determine an edge correction flag indicating whether edge correction is to be performed, an effect type flag indicating a type of edge correction effect, and an edge correction parameter for correcting a reconstructed pixel included in a current block in units of frames, slices, or blocks.

Through rate distortion optimization (RDO) processing, the parameter determiner 12 may determine an edge correction parameter in units of slices and determine an edge correction flag and an effect type flag in units of blocks. In detail, the parameter determiner 12 may calculate a degree of distortion between an original image and a reconstructed image and costs based on a size of residual data by applying the edge correction flag, the effect type flag, and the edge correction parameter to a reconstructed image. For example, the parameter determiner 12 may determine a value at which costs are minimized by applying various values to each of the edge correction flag, the effect type flag, and the edge correction parameter.

In an embodiment, the parameter determiner 12 may determine the edge correction flag, the effect type flag, and the edge correction parameter in units of blocks.

In an embodiment, the edge correction parameter may be individually determined for a luma component and a chroma component.

In an embodiment, the edge correction parameter may be determined in units of effect type flags. For example, the parameter determiner 12 may determine a smoothing effect or a sharpening effect to be a type of edge correction effect in units of blocks. In this case, when the effect type flag is 0, the parameter determiner 12 may determine an edge correction parameter for applying the smoothing effect. In contrast, when the effect type flag is 1, the parameter determiner 12 may determine an edge correction parameter for applying the sharpening effect.

The edge corrector 14 may correct a reconstructed pixel included in a current block on the basis of the determined edge correction parameter. The edge corrector 14 may correct the reconstructed pixel included in the current block on the basis of the edge correction parameter according to the value of the effect type flag. For example, when the smoothing effect is applied to the current block, the edge corrector 14 may correct the reconstructed pixel included in the current block on the basis of the edge correction parameter for applying the smoothing effect. In contrast, when the sharpening effect is applied to the current block, the edge corrector 14 may correct the reconstructed pixel included in the current block on the basis of the edge correction parameter for applying the sharpening effect.

In an embodiment, the edge corrector 14 may determine whether a reconstructed pixel is included in an edge region. The edge corrector 14 may determine whether the reconstructed pixel is included in the edge region according to a first threshold value included in the edge correction parameter. When the reconstructed pixel is included in the edge region, the edge corrector 14 may determine whether the reconstructed pixel is to be corrected, according to a second threshold value included in the edge correction parameter. When the reconstructed pixel is to be corrected, the edge corrector 14 may compensate for a sample value of the reconstructed pixel according to a third threshold value included in the edge correction parameter. In this case, at least two values among the first threshold value, the second threshold value, and the third threshold value may be the same value.

The video encoding apparatus 10 may encode the edge correction flag, the effect type flag, and the edge correction parameter into a bitstream and transmit the bitstream to a video decoding apparatus 30. In this case, a plurality of edge correction parameters for values of the effect type flag may be encoded and transmitted to the video decoding apparatus 30.

In an embodiment, the video encoding apparatus 10 may encode the edge correction flag and the effect type flag and transmit them in a block segment header of a bitstream to the video decoding apparatus 30. Alternatively, the video encoding apparatus 10 may encode the edge correction parameter and transmit it in a slice segment header of the bitstream to the video decoding apparatus 30.

In an embodiment, the video encoding apparatus 10 may encode a residual value between the reconstructed image compensated using the edge corrector 14 and the original image, and transmit a bitstream including the encoded residual value to the video decoding apparatus 30.

In an embodiment, the video encoding apparatus 10 may not transmit an edge correction flag and an effect type flag for a chroma component to the video decoding apparatus 30. In this case, the video decoding apparatus 30 may determine values of the edge correction flag and the effect type flag for the chroma component by using values of an edge correction flag and an effect type flag for a luma component. In an embodiment, the video encoding apparatus 10 may include a central processing unit (CPU) (not shown) for overall control of the parameter determiner 12 and edge corrector 14. Alternatively, the parameter determiner 12 and the edge corrector 14 may be operated by different processors thereof (not shown), and the whole video encoding apparatus 10 may be operated by operating the processors in relation to each other. Alternatively, in an embodiment, the parameter determiner 12 and the edge corrector 14 may be controlled by an external processor (not shown) of the video encoding apparatus 10.

In an embodiment, the video encoding apparatus 10 may include at least one data storage unit (not shown) for storing data input to and output from the parameter determiner 12 and the edge corrector 14. The video encoding apparatus 10 may include a memory controller (not shown) for controlling data input and output in the data storage unit.

In an embodiment, the video encoding apparatus 10 may perform a video encoding operation including transformation by being operated in conjunction with a video encoding processor installed therein or an external video encoding processor to output a result of encoding an image. In an embodiment, an inner video encoding processor of the video encoding apparatus 10 may be a separate processor and implement a video encoding operation. Alternatively, the video encoding apparatus 10, the CPU, or a graphic processing unit may include a video encoding processing module to implement a basic video encoding operation.

Figure 2:
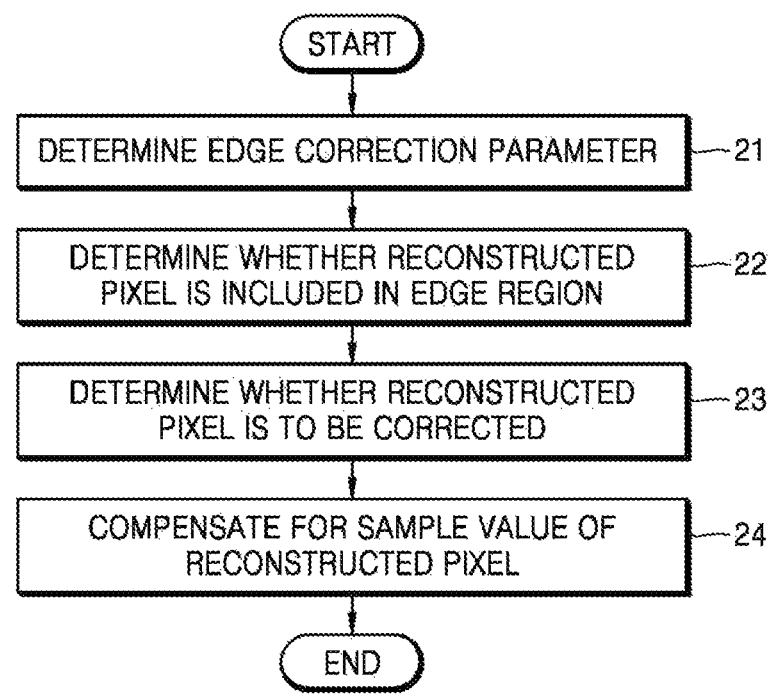
FIG. 2 is a flowchart of a video encoding method according to an embodiment.

FIG. 2 is a flowchart of a video encoding method according to an embodiment.

In operation 21, the parameter determiner 12 may determine an edge correction parameter for correcting a reconstructed pixel included in a current block.

In an embodiment, the edge correction parameter may include a first threshold value for determining whether the reconstructed pixel is included in an edge region, a second threshold value for determining whether the reconstructed pixel is to be corrected, and a third threshold value for compensating for a sample value of the reconstructed pixel. In this case, at least two values among the first threshold value, the second threshold value, and the third threshold value may be the same value.

In an embodiment, the edge correction parameter may include at least one of a parameter for a luma component and a parameter for a chroma component.

In operation 22, the edge corrector 14 may determine whether the reconstructed pixel is included in the edge region on the basis of the first threshold value included in the edge correction parameter. For example, the edge corrector 14 may determine that the reconstructed pixel is included in the edge region when the difference between a sample value of the reconstructed pixel and a sample value of at least one neighboring pixel of the reconstructed pixel is greater than or equal to the first threshold value.

In operation 23, when the reconstructed pixel is included in the edge region, the edge corrector 14 may determine whether the reconstructed pixel is to be corrected on the basis of the second threshold value included in the edge correction parameter. For example, the edge corrector 14 may determine that the reconstructed pixel is to be corrected when the difference between the sample value of the reconstructed pixel and a mean of a sample value of the at least one neighboring pixel of the reconstructed pixel is greater than or equal to the second threshold value.

In operation 24, when the reconstructed pixel is to be corrected, the edge corrector 14 may compensate for the sample value of the reconstructed pixel according to the third threshold value included in the edge correction parameter. For example, the edge corrector 14 may increase or decrease the sample value of the reconstructed pixel when the difference between the sample value of the reconstructed pixel and the mean of the sample value of the at least one neighboring pixel of the reconstructed pixel is greater than or equal to the third threshold value.

In an embodiment, the edge corrector 14 may compensate for the sample value of the reconstructed pixel according to the third threshold value related to the value of the effect type flag. In this case, when the value of the effect type flag indicates application of the smoothing effect to a current block, the sample value of the reconstructed pixel may be compensated for to reduce a difference value between the reconstructed pixel and neighboring pixels of the reconstructed pixel. Alternatively, when the value of the effect type flag indicates application of the smoothing effect to the current block, the sample value of the reconstructed pixel may be compensated for to increase the difference value between the reconstructed pixel and the neighboring pixels of the reconstructed pixel.

Figure 3:
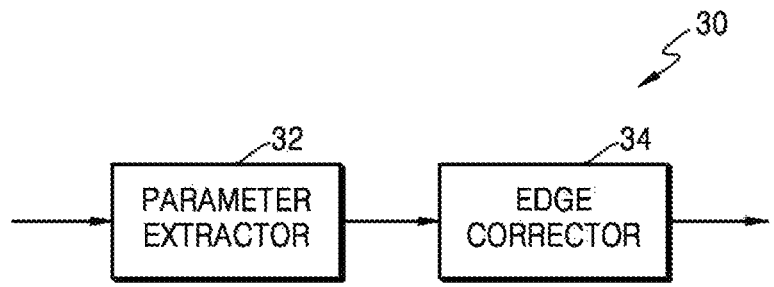
FIG. 3 is a block diagram of a video decoding apparatus 30 according to an embodiment.

FIG. 3 is a block diagram of the video decoding apparatus 30 according to an embodiment.

In an embodiment, the video decoding apparatus 30 includes a parameter extractor 32 and an edge corrector 34.

In an embodiment, the video decoding apparatus 30 receives a bitstream including encoded data of a video. The video decoding apparatus 30 may produce a reconstructed video by parsing encoded video samples from the received bitstream and generating reconstructed pixels by performing entropy decoding, inverse quantization, inverse transformation, prediction, and motion compensation in units of blocks of the video.

The parameter extractor 32 may parse an edge correction flag, an effect type flag, and an edge correction parameter from the bitstream. For example, the parameter extractor 32 may parse the edge correction flag and the effect type flag from a block segment header of the bitstream, and parse the edge correction parameter from a slice segment header of the bitstream.

If the edge correction flag is parsed from a block segment header of a current block, the parameter extractor 32 may not parse the effect type flag from the block segment header when the edge correction flag is 0. Thus, the edge corrector 34 may not perform edge correction on the current block. In contrast, the parameter extractor 32 may parse the effect type flag from the block segment header when the edge correction flag is 1. The edge corrector 34 may not perform edge correction on the current block according to the effect type flag. For example, when the effect type flag is 0, the edge corrector 34 may perform edge correction such that the smoothing effect is applied to the current block. In contrast, when the effect type flag is 1, the edge corrector 34 may perform edge correction such that the sharpening effect is applied to the current block.

In an embodiment, when an edge correction flag and an effect type flag for a chroma component are not received, the parameter extractor 32 may determine the edge correction flag and the effect type flag for the chroma component by using an edge correction flag and an effect type flag for a luma component.

The edge corrector 34 may correct a reconstructed pixel included in the current block on the basis of the parsed edge correction parameter. The edge corrector 34 may correct the reconstructed pixel included in the current block on the basis of the edge correction parameter according to the effect type flag. For example, when the smoothing effect is applied to the current block, the edge corrector 34 may correct the reconstructed pixel included in the current block on the basis of the edge correction parameter for applying the smoothing effect. In contrast, when the sharpening effect is applied to the current block, the edge corrector 34 may correct the reconstructed pixel included in the current block on the basis of the edge correction parameter for applying the sharpening effect.

In an embodiment, the edge corrector 34 may determine whether the reconstructed pixel is included in an edge region. The edge corrector 34 may determine whether the reconstructed pixel is included in the edge region according to a first threshold value included in the edge correction parameter. When the reconstructed pixel is included in an edge region, the edge corrector 34 may determine whether the reconstructed pixel is to be corrected according to a second threshold value included in the edge correction parameter. When the reconstructed pixel is to be corrected, the edge corrector 34 may compensate for a sample value of the reconstructed pixel according to a third threshold value included in the edge correction parameter. In this case, at least one among the first threshold value, the second threshold value, and the third threshold value may be the same value.

In an embodiment, the video decoding apparatus 30 may include a CPU (not shown) for overall control of the parameter extractor 32 and the edge corrector 34. Alternatively, the parameter extractor 32 and the edge corrector 34 may be operated by different processors (not shown) thereof, and the whole video decoding apparatus 30 may be operated by operating the processors in relation to each other. Alternatively, in an embodiment, the parameter extractor 32 and the edge corrector 34 may be controlled by an external processor (not shown) of the video decoding apparatus 30.

In an embodiment, the video decoding apparatus 30 may include at least one data storage unit (not shown) for storing data input to and output from the parameter extractor 32 and the edge corrector 34. The video decoding apparatus 30 may include a memory controller (not shown) for controlling data input and output in the data storage unit.

In an embodiment, the video decoding apparatus 30 may be operated in conjunction with a video decoding processor installed therein or an external video decoding processor to decode a video to reconstruct the video. In an embodiment, an inner video decoding processor of the video decoding apparatus 30 may be a separate processor and implement a basic video decoding operation. Alternatively, the video decoding apparatus 30, the CPU, or a graphic processing unit may include a video decoding processing module to implement a basic video decoding operation.

A video decoding method performed by a video decoding apparatus will be described in detail with reference to FIG. 4 below.

Figure 4:
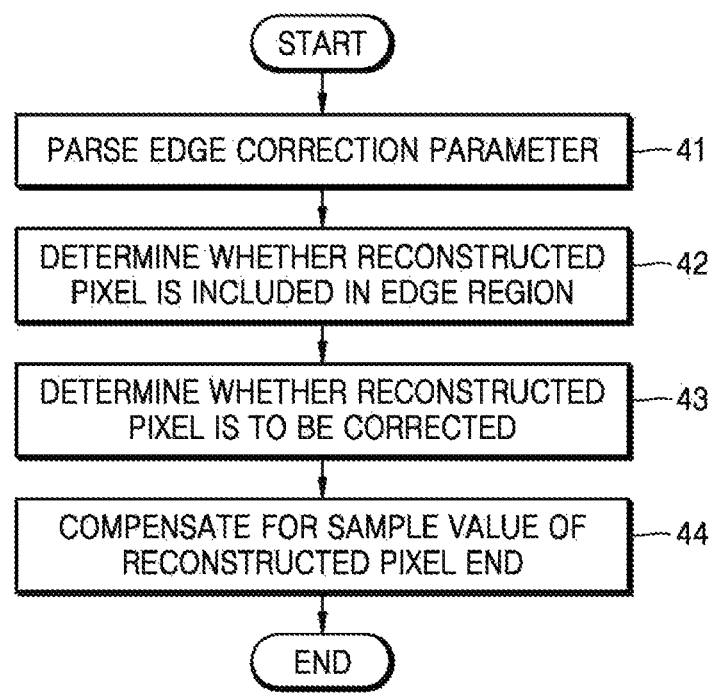
FIG. 4 is a flowchart of a video decoding method according to an embodiment.

FIG. 4 is a flowchart of a video decoding method according to an embodiment.

In operation 41, the parameter extractor 32 may parse an edge correction parameter for correcting a reconstructed pixel included in a current block.

In an embodiment, the edge correction parameter may include a first threshold value for determining whether the reconstructed pixel is included in an edge region, a second threshold value for determining whether the reconstructed pixel is to be corrected, and a third threshold value for compensating for a sample value of the reconstructed pixel. In this case, at least two values among the first threshold value, the second threshold value, and the third threshold value may be the same value.

In an embodiment, the edge correction parameter may include at least one of a parameter for a luma component and a parameter for a chroma component.

In an embodiment, the parameter extractor 32 may parse the edge correction parameter from a slice segment header of a bitstream. The parameter extractor 32 may parse the edge correction flag from a block segment header. The parameter extractor 32 may parse the effect type flag from a block segment header of the bitstream.

In operation 42, the edge corrector 34 may determine whether the reconstructed pixel is included in an edge region on the basis of the first threshold value included in the edge correction parameter. For example, the edge corrector 34 may determine that the reconstructed pixel is included in the edge region when the difference between a sample value of the reconstructed pixel and a sample value of at least one neighboring pixel of the reconstructed pixel is greater than or equal to the first threshold value.

In operation 43, when the reconstructed pixel is included in the edge region, the edge corrector 34 may determine whether the reconstructed pixel is to be corrected on the basis of the second threshold value included in the edge correction parameter. For example, the edge corrector 34 may determine that the reconstructed pixel is to be corrected when the difference between the sample value of the reconstructed pixel and a mean of a sample value of at least one neighboring pixel of the reconstructed pixel is greater than or equal to the second threshold value.

In operation 44, when the reconstructed pixel is to be corrected, the edge corrector 34 may compensate for the sample value of the reconstructed pixel on the basis of the third threshold value included in the edge correction parameter. For example, the edge corrector 34 may increase or decrease the sample value of the reconstructed pixel when the difference between the sample value of the reconstructed pixel and a mean of a sample value of at least one neighboring pixel of the reconstructed pixel is greater than or equal to the third threshold value.

In an embodiment, the edge corrector 34 may compensate for the sample value of the reconstructed pixel according to the third threshold value related to the effect type flag. In this case, when the effect type flag indicates application of the smoothing effect to a current block, the sample value of the reconstructed pixel may be compensated for to reduce the difference between values of the reconstructed pixel and neighboring pixels of the reconstructed pixel. Alternatively, when the effect type flag indicates application of the smoothing effect to the current block, the sample value of the reconstructed pixel may be compensated for to increase the difference between the values of the reconstructed pixel and neighboring pixels of the reconstructed pixel.

The video encoding apparatus 10 and the video decoding apparatus 30 according to an embodiment described above with reference to FIGS. 1 to 4 use an edge correction technique to minimize an error between an original image and a reconstructed image. Samples are signaled between the video encoding apparatus 10 and the video decoding apparatus 30. That is, the video encoding apparatus 10 may encode samples and transmit the encoded samples in a bitstream. The video decoding apparatus 30 may receive the bitstream and reconstructed the samples by parsing the samples from the bitstream. In an embodiment, the edge correction parameter is signaled between the video encoding apparatus 10 and the video decoding apparatus 30 to minimize an error between an original pixel and a reconstructed pixel in an edge region. Thus, according to an edge correction technique according to an embodiment, the video decoding apparatus 30 may produce a reconstructed image having a minimum error in an edge region with respect to an original image by generating reconstructed pixels for each of video blocks by decoding a received bitstream and then adjusting sample values of the reconstructed pixels by reconstructing an edge correction parameter from the bitstream.

A video encoding method using an edge correction technique will be described with reference to FIG. 5 below.

Figure 5:
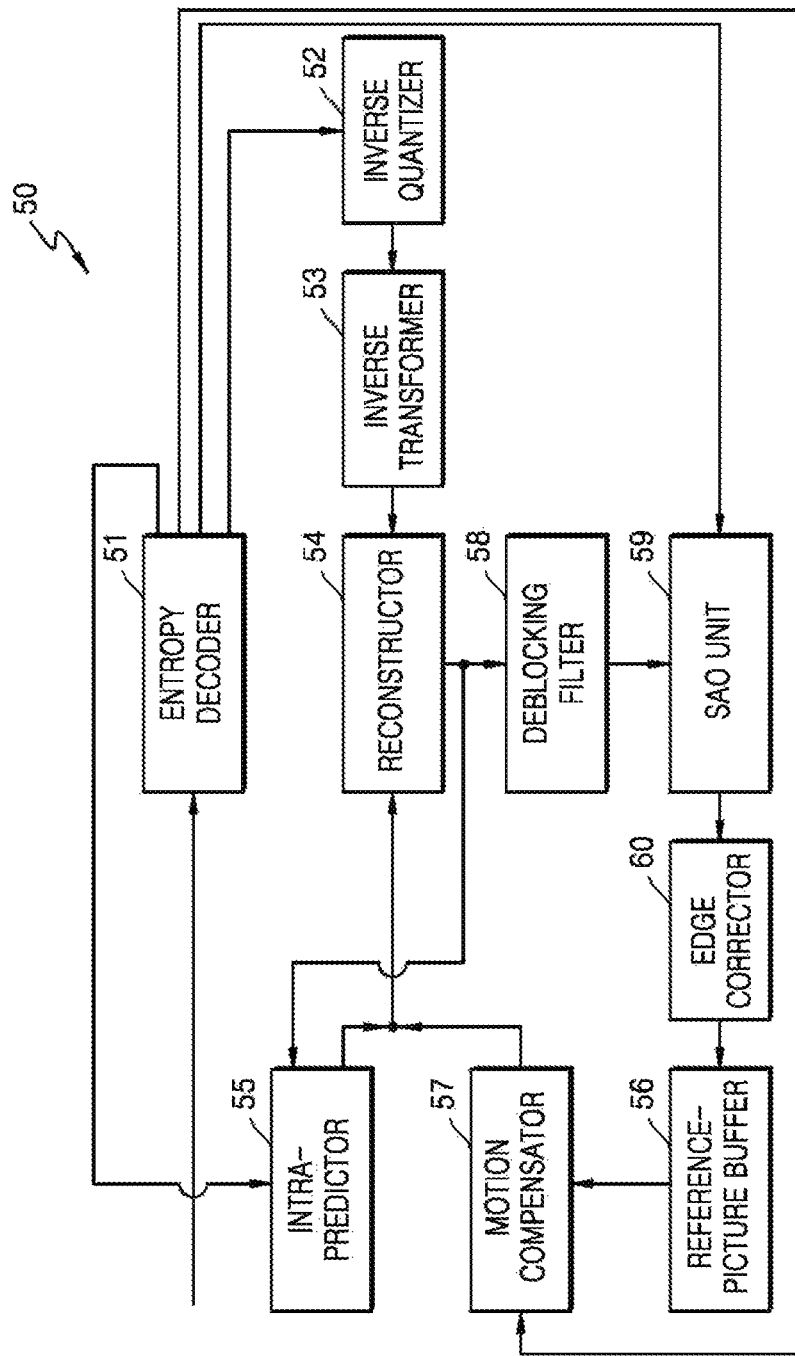
FIG. 5 is a block diagram of a video decoding apparatus 50 according to another embodiment.

FIG. 5 is a block diagram of a video decoding apparatus 50 according to another embodiment.

Referring to FIG. 5, the video decoding apparatus 50 includes an entropy decoder 51, an inverse quantizer 52, an inverse transformer 53, a reconstructor 54, an intra-predictor 55, a reference-picture buffer 56, a motion compensator 57, a deblocking filter 58, an sample adaptive offset (SAO) unit 59, and an edge corrector 60.

The video decoding apparatus 50 may receive a bitstream including encoded video data. The entropy decoder 51 may parse intra-mode information, inter-mode information, SAO information, residues, and information for edge correction from the bitstream.

The resides extracted by the entropy decoder 51 may be quantized transformation coefficients. Thus, transformation coefficients may be reconstructed by performing inverse quantization on the residues by the inverse quantizer 52, and spatial-domain residual values may be reconstructed by performing inverse transformation on the reconstructed coefficients reconstructed by the inverse transformer 53.

Intra-prediction or motion compensation may be performed to predict and reconstruct the spatial-domain residual values.

When the entropy decoder 51 extracts the intra-mode information, the intra-predictor 55 may determine neighboring samples to be used to reconstruct a current sample among neighboring samples spatially adjacent to the current sample on the basis of the intra-mode information. Neighboring samples may be selected from among samples previously reconstructed by the reconstructor 54. The reconstructor 54 may reconstruct current samples by using reference samples determined based on the intra-mode information and the residual values reconstructed by the inverse transformer 53.

When the inter-mode information is extracted by the entropy decoder 51, the motion compensator 57 may determine samples to be referred to reconstruct a current sample of the current picture among pictures reconstructed earlier than a current picture on the basis of the inter-mode information. The inter-mode information may include a motion vector, a reference index, etc. Using the reference index, a reference picture for performing motion compensation on a current sample may be determined among pictures reconstructed earlier than the current picture and stored in the reference-picture buffer 56. Using the motion vector, a reference block for performing motion compensation on a current block among blocks of the reference picture may be determined. The reconstructor 54 may reconstruct current samples by using the reference block determined based on the inter-mode information and the residual values reconstructed by the inverse transformer 53.

The reconstructor 54 may reconstruct samples and output reconstructed pixels. The reconstructor 54 may generate reconstructed pixels for each largest coding unit, based on coding units of a tree structure.

The deblocking filter 58 may perform filtering on each largest coding unit or each of coding units of a tree structure to reduce a blocking phenomenon with respect to pixels in a border region between coding units.

The SAO unit 59 may control an offset between the reconstructed pixels for each largest coding unit according to an SAO technique. The SAO unit 59 may determine an offset type, an offset class, and offset values for a current largest coding unit from the SAO information extracted by the entropy decoder 51. The SAO unit 59 may increase or decrease a sample value of each of reconstructed pixels by a difference value determined from an offset value, thereby reducing an error between reconstructed pixels and original pixels.

In an embodiment of the present disclosure, the edge corrector 60 may reduce an error between reconstructed pixels and original pixels in an edge region. The edge corrector 60 may compensate for a sample value of a reconstructed pixel on the basis of an edge correction flag, an effect type flag, and an edge correction parameter extracted by the parameter extractor 32. First, the edge corrector 60 may determine whether the reconstructed pixel is included in the edge region on the basis of a first threshold value included in the edge correction parameter. When the reconstructed pixel is included in the edge region, the edge corrector 60 may determine whether the reconstructed pixel is to be corrected on the basis of a second threshold value included in the edge correction parameter. When the reconstructed pixel is to be corrected, the edge corrector 60 may compensate for a sample value of the reconstructed pixel on the basis of a third threshold value included in the edge correction parameter.

The extracting of the edge correction flag, the effect type flag, and the edge correction parameter by the entropy decoder 51 may correspond to an operation of the parameter extractor 32 of the video decoding apparatus 30. Operations of the edge corrector 60 may correspond to those of the edge corrector 34 of the video decoding apparatus 30.

In FIG. 5, an operation of the edge corrector 60 is performed after that of the SAO unit 59, but in another embodiment, the edge corrector 60 may be located in front of the SAO unit 59 and thus the operation of the edge corrector 60 may be performed prior to that of the SAO unit 59. Alternatively, the edge corrector 60 may be located in front of the deblocking filter 58 and thus the operation of the edge corrector 60 may be performed prior to that of the deblocking filter 58. Alternatively, the edge corrector 60 may serve as the SAO unit 59 and thus the operation of the edge corrector 60 may be performed instead of the operation of the SAO unit 59.

In an embodiment, the edge corrector 60 may be operated in conjunction with the SAO unit 59. For example, an operation of the edge corrector 60 may be determined according to whether the SAO unit 59 is on or off. For example, when a flag of a slice segment header which indicates whether the SAO unit 59 is to be operated or not is 0 indicating 'off', parsing of at least one among the edge correction flag, the effect type flag, and the edge correction parameter may be limited. Thus, an operation of the edge corrector 60 may not be performed. In contrast, when a flag of a slice segment header which indicates whether the SAO unit 59 is to be operated or not is 1 indicating 'on', the edge correction flag, the effect type flag, and the edge correction parameter may be parsed and thus an operation of the edge corrector 60 may be performed. For example, when a flag indicating whether the SAO unit 59 is to be operated is 1 indicating 'on', the effect type flag may be parsed and edge correction according to the smoothing effect or the sharpening effect may be applied to a reconstructed pixel according to the effect type flag.

Processes of correcting a reconstructed pixel included in an edge region according to various embodiments will be described below.

Figure 6A:
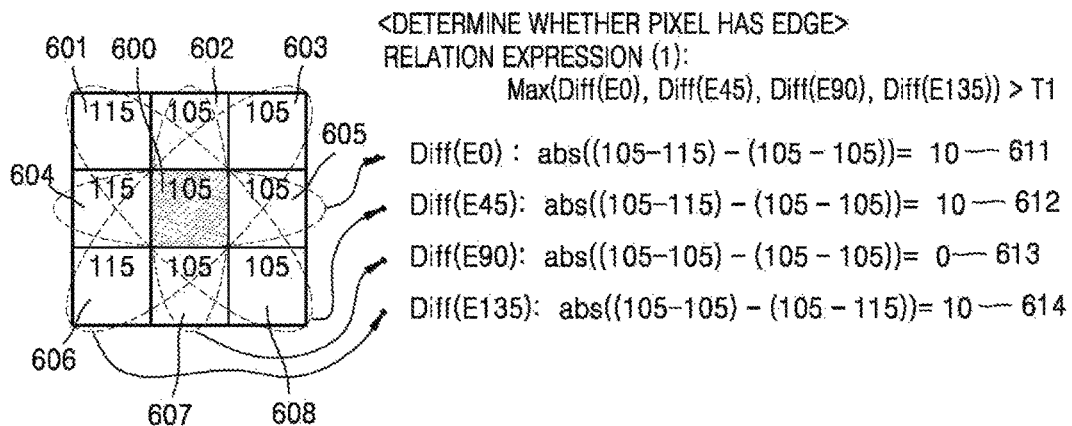
Figure 6B:
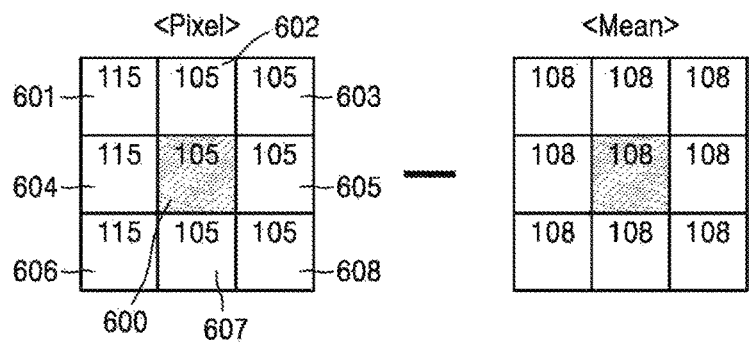

FIGS. 6A to 6C illustrate a process of correcting a reconstructed pixel included in a current block, performed by the edge corrector 60, according to an embodiment.

FIG. 6A illustrates a process of determining whether each of reconstructed pixels included in a current block is included in an edge region. When it is determined that a reconstructed pixel is included in the edge region, whether the reconstructed pixel is to be corrected may be determined as illustrated in FIG. 6B. When the reconstructed pixel is to be corrected, a pixel value of a current reconstructed pixel may be compensated for as illustrated in FIG. 6C.

In FIG. 6A, it may be determined whether a reconstructed pixel included in the current block is included in the edge region may be determined according to a first threshold value T1 included in an edge correction parameter.

To this end, it may be determined whether a maximum value among the differences between a sample value of the reconstructed pixel and sample values of neighboring pixels located in predetermined directions with respect to the reconstructed pixel is greater than the first threshold value T1 or not. For example, it may be determined whether a maximum value among the differences between the sample value of the reconstructed pixel and sample values of neighboring pixels located in a direction of 0, 90, 45 or 135 degrees with respect to the reconstructed pixel is greater than the first threshold value T1. The neighboring pixels are not limited to the neighboring pixels located in the above-described directions with respect to reconstructed pixel, and may be pixels located in various directions. Pixels located in directions, the number of which is less than that of the four directions described above as examples may be used as neighboring pixels. The difference between values of pixels may be calculated in various ways, for example, using a first differential value, a second differential value, or the like but will be described mainly using a second differential value below.

An embodiment in which neighboring pixels located in a direction of 0, 90, 45 or 135 degrees are used may be expressed with the following relation expression (1):

$$\text{Max}(\text{Diff}(E0),\text{Diff}(E45),\text{Diff}(E90),\text{Diff}(E135))>T1 \quad (1)$$

In relation expression (1) above, Diff(E0) may represent the difference between a sample value of a reconstructed pixel 600 and sample values of neighboring pixels 604 and 605 located in the direction of 0 degrees.

For example, the difference Diff(E0) may be abs((sample value of reconstructed pixel 600−sample value of left neighboring pixel 604)−(sample value of reconstructed pixel 600−sample value of right neighboring pixel 605). In detail, when the sample value of the reconstructed pixel 600 is 105, the sample value of the left neighboring pixel 604 is 115, and the sample value of the right neighboring pixel 605 is 105, the difference Diff(E0) may be abs((105−115)−(105−105))=10 in the direction of 0 degrees, as indicated by reference numeral 611 of FIG. 6A.

Diff(E45) may represent the difference between the sample value of the reconstructed pixel 600 and sample values of neighboring pixels 601 and 608 located in the direction of 45 degrees.

For example, the difference Diff(E45) may be abs ((sample value of reconstructed pixel 600−sample value of-upper left neighboring pixel 601)−(sample value of reconstructed pixel 600−sample value of lower right neighboring pixel 608)). In detail, when the sample value of the reconstructed pixel 600 is 105, the sample value of the upper left neighboring pixel 601 is 115, and the sample value of the lower right neighboring pixel 608 is 105, the difference Diff(E45) may be abs((105−115)−(105−105))=10 in the direction of 45 degrees, as indicated by reference numeral 612 of FIG. 6A.

Diff(E90) may represent the difference between the sample value of the reconstructed pixel 600 and sample values of neighboring pixels 602 and 607 located in the direction of 90 degrees.

For example, the difference Diff(E90) may be abs ((sample value of reconstructed pixel 600−sample value of upper neighboring pixel 602)−(sample value of reconstructed pixel 600−sample value of lower neighboring pixel 607)). In detail, when the sample value of the reconstructed pixel 600 is 105, the sample value of an upper neighboring pixel is 105, and the sample value of a lower neighboring pixel is 105, the difference Diff(E90) may be abs((105−105)−(105−105))=0 in the direction of 90 degrees, as indicated by reference numeral 613 of FIG. 6A.

Diff(E135) may represent the difference between the sample value of the reconstructed pixel 600 and sample values of neighboring pixels 603 and 606 located in the direction of 135 degrees.

For example, the difference Diff(E135) may be abs ((sample value of reconstructed pixel 600−sample value of upper right neighboring pixel 603)−(samples value of reconstructed pixel 600−sample value of lower left neighboring pixel 606)). In detail, when the sample value of the reconstructed pixel 600 is 105, the sample value of the upper right neighboring pixel is 105, and the sample value of the lower left neighboring pixel is 115, the difference Diff(E135) may be abs((105−105)−(105−115))=10 in the direction of 135 degrees, as indicated by reference numeral 614 of FIG. 6A.

In relation expression (1), when the differences Diff(E0), Diff(E45), Diff(E90), and Diff(E135) are individually calculated, a maximum value among the differences may be determined. For example, when the differences Diff(E0), Diff(E45), Diff(E90), and Diff(E135) are respectively 10, 10, 0, and 10, a maximum value MAX(10,10,0,10)=10.

When the maximum value among the differences between the sample value of the reconstructed pixel of the current block and the sample values of the neighboring pixels is determined, whether the reconstructed pixel is included in the edge region may be determined according to whether the maximum value is greater than the first threshold value T1 or not. In this case, the first threshold value T1 may be obtained from the edge correction parameter.

For example, if the first threshold value T1 is 10, it may be determined that the current reconstructed pixel is not included in the edge region when the maximum value calculated by relation expression (1) is 5. In contrast, if the first threshold value is 10, it may be determined that the current reconstructed pixel is included in the edge region when the maximum value calculated by relation expression (1) is 15.

In FIG. 6B, when it is determined that current reconstructed pixel is included in the edge region, whether the reconstructed pixel is to be corrected may be determined.

To this end, it may be determined whether an absolute value of the difference between the sample value of the current reconstructed pixel and a mean of sample values of neighboring pixels located around the reconstructed pixel and the current reconstructed pixel is greater than a second threshold value T2. For example, whether the difference between the sample value of the reconstructed pixel of the current block and a mean of sample values of the reconstructed pixel and neighboring pixels located in upper, lower, left, right, upper right, lower right, upper left and lower left directions of the reconstructed pixel is greater than the second threshold value T2. However, the neighboring pixels are not limited to those located in the above-described directions and pixels located in directions, the number of which is less than that of the above-described directions may be used as neighboring pixels. For example, various numbers of neighboring pixels, e.g., two to eight neighboring pixels, may be used. For example, only pixels located in the upper and lower directions of the reconstructed pixel may be used as neighboring pixels.

The above description may be expressed by the following relation expression (2):

$$\text{If}(\text{abs}(\text{Pixel}-\text{Mean})>T2) \qquad (2)$$

In relation expression (2), Pixel may represent the sample value of the current reconstructed pixel, and Mean may represent a mean of the sample values of the reconstructed pixel and the neighboring pixels. In relation expression (2), a median, a mode, or the like may be used instead of the mean. In an embodiment, a weight may be allocated or an offset value may be added.

In relation expression (2), for example, the mean Mean may be a mean of the sample value of the reconstructed pixel 600, the sample value of the upper left neighboring pixel 601, the sample value of the upper neighboring pixel 602, the sample value of the upper right neighboring pixel 603, the sample value of the left neighboring pixel 604, the sample value of the right neighboring pixel 605, the sample value of the lower left neighboring pixel 606, the sample value of the lower neighboring pixel 607, and the sample value of the lower right neighboring pixel(608). In detail, the mean Mean may be Abg(105,115,105,105,115,105,115,105, 105)=108.xx.

In relation expression (2), when the mean Mean is calculated, an absolute value of the difference between the sample value of the current reconstructed pixel and the mean Mean may be calculated.

When the absolute value of the difference between the sample value of the current reconstructed pixel and the mean Mean is calculated, whether the reconstructed pixel is to be corrected may be determined. That is, when the absolute value of the difference between the sample value of the current reconstructed pixel and the mean Mean is greater than the second threshold value T2, the current reconstructed pixel may be determined to be corrected.

For example, if a second threshold value T2' for applying the smoothing effect is 1, when the absolute value of the difference between the sample value of the current reconstructed pixel and the mean Mean is abs(Pixel−Mean)=abs (105−108)=3, the absolute value is greater than the second threshold value T2' and thus the current reconstructed pixel may be determined to be corrected. If second threshold value T2' for applying the smoothing effect is 5, when the absolute value of the difference between the sample value of the current reconstructed pixel and the mean Mean is abs(Pixel−Mean)=abs(105−108)=3, the absolute value is less than the second threshold value T2' and the current reconstructed pixel may be determined not to be corrected.

If a second threshold value T2" for applying the sharpening effect is 1, when the absolute value of the difference between the sample value of the current reconstructed pixel and the mean Mean is abs(Pixel−Mean)=abs(105−108)=3, the absolute value is greater than the second threshold value T2" and thus the current reconstructed pixel may be determined to be corrected. If second threshold value T2" for applying the sharpening effect is 5, when the absolute value of the difference between the sample value of the current reconstructed pixel and the mean Mean is abs(Pixel−Mean)=abs(105−108)=3, the absolute value is less than the second threshold value T2" and thus s the current reconstructed pixel may be determined not to be corrected.

In FIG. 6C, when it is determined that a current reconstructed pixel is to be corrected, a sample value of a reconstructed pixel may be compensated for.

In FIG. 6C, when an absolute value of the difference between a sample value of the current reconstructed pixel and a mean of the sample value of the reconstructed pixel and sample values of neighboring pixels around the current reconstructed pixel exceeds a third threshold value T3, the sample value of the current reconstructed pixel may be decreased or increased by a predetermined value. For example, it may be determined whether an absolute value of the difference between a sample value of a reconstructed pixel of a current block and a mean of the sample value of the reconstructed pixel and sample values of neighboring pixels located in the upper, lower, left, right, upper right, lower right, upper left, and lower left directions of the reconstructed pixel is greater than the third threshold value T3. The neighboring pixels are not limited to those located in the above-described directions of the reconstructed pixel, and pixels located in directions, the number of which is less than that of the above-described directions may be used as neighboring pixels. For example, various numbers of neighboring pixels, e.g., two to eight neighboring pixels, may be used.

The above description may be expressed by the following relation expression (3), relation expression (4) and relation expression (5), according to a value by which the sample value of the current reconstructed pixel is decreased or increased:

$$\text{If}(\text{abs}(\text{Pixel}-\text{Mean})>T3)->-1 \text{ or } +1 \qquad (3)$$

$$\text{If}(\text{abs}(\text{Pixel}-\text{Mean})>T4)->-2 \text{ or } +2 \qquad (4)$$

$$\text{If}(\text{abs}(\text{Pixel}-\text{Mean})>T5)->-3 \text{ or } +3 \qquad (5)$$

In relation expression (3), relation expression (4), and relation expression (5), Pixel may represent the sample value of the current reconstructed pixel, and Mean may represent a mean of the sample values of the reconstructed pixel and the neighboring pixels. In this case, a median, a mode, or the like may be used instead of the mean. In another embodiment, a weight may be allocated or an offset value may be added.

Referring to (a) of FIG. 6C, when in relation expression (3), an absolute value of the difference between the sample value of the current reconstructed pixel and the mean exceeds the third threshold value T3, the sample value of the current reconstructed pixel may be reduced or increased by 1. Alternatively, referring to (b) of FIG. 6C, when in relation expression (4), the absolute value of the difference between the sample value of the current reconstructed pixel and the mean exceeds a fourth threshold value T4, the sample value of the current reconstructed pixel may be reduced or increased by 2. Alternatively, referring to (c) of FIG. 6C, when in relation expression (5), the absolute value of the difference between the sample value of the current reconstructed pixel and the mean exceeds a fifth threshold value T5, the sample value of the current reconstructed pixel may be reduced or increased by 3.

For example, if a third threshold value T3' for applying the smoothing effect is 1, when the absolute value of the difference between the sample value of the current reconstructed pixel and the mean is abs(Pixel−Mean)=abs(105− 108)=3, the absolute value is greater than the third threshold value T3' and thus the sample value of the current reconstructed pixel may be reduced by 1 to become 104.

If the third threshold value T3' for applying the smoothing effect is 5, when the absolute value of the difference between the sample value of the current reconstructed pixel and the mean is abs(Pixel−Mean)=abs(105−108)=3, the absolute value is less than the third threshold value T3' and thus the sample value of the current reconstructed pixel may be maintained.

As another example, if a third threshold value T3" for applying the sharpening effect to the current reconstructed pixel is 1, when the absolute value of the difference between the sample value of the current reconstructed pixel and the mean is abs(Pixel−Mean)=abs(105−108)=3, the absolute value is greater than the third threshold value T3" and thus the sample value of the current reconstructed pixel may be increased by 1 to become 106. If third threshold value T3" for applying the sharpening effect to the current reconstructed pixel is 5, when the absolute value of the difference between the sample value of the current reconstructed pixel and the mean is abs(Pixel−Mean)=abs(105−108)=3, the absolute value is less than the third threshold value T3" and thus the sample value of the current reconstructed pixel may be maintained.

As another example, if the third threshold value T3' for applying the smoothing effect is 1, a fourth threshold value T4' is 3, and a fifth threshold value T5' is 5, when the absolute value of the difference between the sample value of the current reconstructed pixel and the mean is abs(Pixel−Mean)=abs(105−108)=4, the absolute value is greater than the fourth threshold value T4' and less than the fifth threshold value T5' and thus the sample value of the reconstructed pixel may be reduced by −2.

As another example, if the third threshold value T3" for applying the sharpening effect is 1, a fourth threshold value T4" is 3, and a fifth threshold value T5" is 5, when the absolute value of the difference between the sample value of the current reconstructed pixel and the mean is 4, the absolute value is greater than the fourth threshold value T4" and less than the fifth threshold value T5" and thus the sample value of the reconstructed pixel may be increased by +2.

Figure 7:
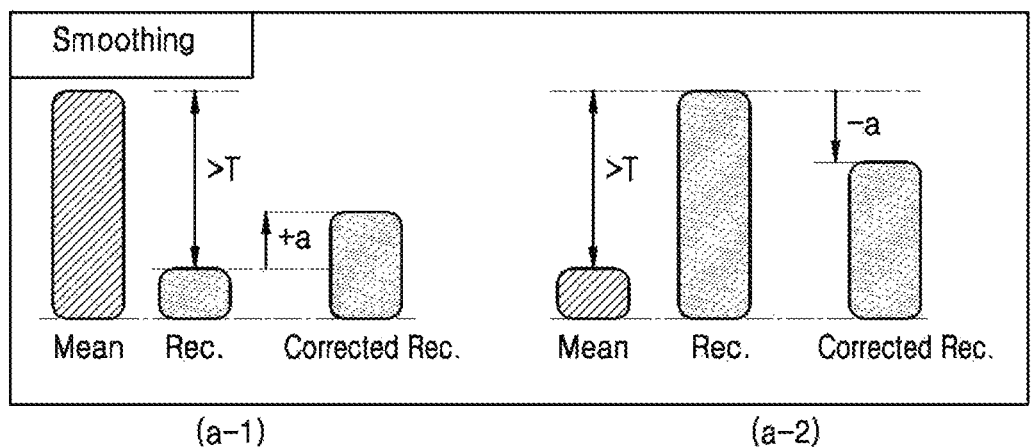
FIG. 7 is a conceptual diagram illustrating a process of correcting a reconstructed pixel, according to an embodiment.
Figure 7:
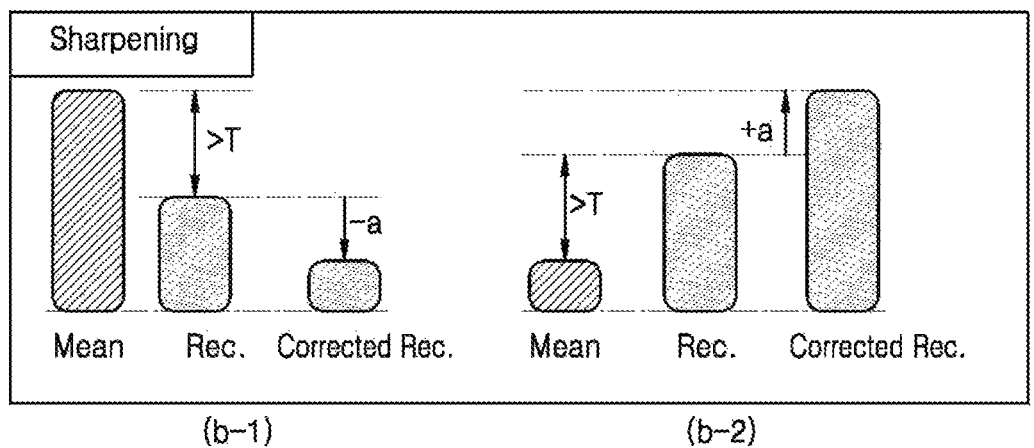

FIG. 7 is a conceptual diagram illustrating a process of correcting a reconstructed pixel, according to an embodiment.

(a-1) and (a-2) of FIG. 7 illustrate processes of correcting a current reconstructed pixel by applying the smoothing effect thereto. Referring to (a-1) of FIG. 7, when an average value of neighboring pixels of the current reconstructed pixel is greater than a sample value of the current reconstructed pixel and the difference between the average value of the neighboring pixels and the sample value of the current reconstructed pixel is greater than a threshold value T, the sample value of the current reconstructed pixel may be increased by a. Referring to (a-2) of FIG. 7, when an average value of neighboring pixels of a current reconstructed pixel is less than a sample value of the current reconstructed pixel and the difference between the average value of the neighboring pixels and the sample value of the current reconstructed pixel is greater than a threshold value T, the sample value of the current reconstructed pixel may be reduced by a.

(b-1) and (b-2) of FIG. 7 illustrate processes of correcting a current reconstructed pixel by applying the smoothing effect thereto. Referring to FIG. (b-1) of 7, when an average value of neighboring pixels of the current reconstructed pixel is greater than a sample value of the current reconstructed pixel and the difference between the average value of the neighboring pixels and the sample value of the current reconstructed pixel is greater than a threshold value T, the sample value of the current reconstructed pixel may be reduced by a. Referring to (b-2) of FIG. 7, if the sharpening effect is applied to a current reconstructed pixel, when an average value of neighboring pixels of the current reconstructed pixel is less than a sample value of the current reconstructed pixel and the difference between the average value of the neighboring pixels and the sample value of the current reconstructed pixel is greater than a threshold value T, the sample value of the current reconstructed pixel may be increased by a.

Figure 8:
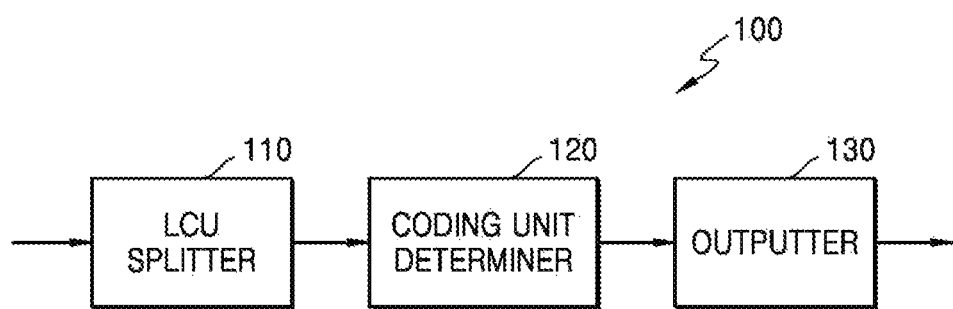
FIG. 8 is a block diagram of a video encoding apparatus based on coding units according to tree structure 100, according to an embodiment of the present disclosure.

FIG. 8 is a block diagram of a video encoding apparatus based on coding units according to tree structure 100, according to an embodiment of the present disclosure.

The video encoding apparatus involving video prediction based on coding units of the tree structure 100 includes a largest coding unit splitter 110, a coding unit determiner 120, and an output unit 130. Hereinafter, for convenience of description, the video encoding apparatus involving video prediction based on coding units of the tree structure 100 is referred to as the 'video encoding apparatus 100'.

The largest coding unit splitter 110 may split a current picture based on a largest coding unit that is a coding unit having a maximum size for a current picture of an image. If the current picture is larger than the largest coding unit, image data of the current picture may be split into the at least one largest coding unit. The largest coding unit according to an embodiment may be a data unit having a size of 32×32, 64×64, 128×128, 256×256, etc., wherein a shape of the data unit is a square having a width and length in powers of 2. The image data may be output to the coding unit determiner 120 in units of the at least one largest coding unit.

A coding unit according to an embodiment may be characterized by a maximum size and a depth. The depth denotes the number of times the coding unit is spatially split from the largest coding unit, and as the depth deepens, deeper coding units according to depths may be split from the largest coding unit to a smallest coding unit. A depth of the largest coding unit may be defined as an uppermost depth and a depth of the smallest coding unit may be defined as a lowermost depth. Since a size of a coding unit corresponding to each depth decreases as the depth of the largest coding unit deepens, a coding unit corresponding to an upper depth may include a plurality of coding units corresponding to lower depths.

As described above, the image data of the current picture is split into the largest coding units according to a maximum size of the coding unit, and each of the largest coding units may include deeper coding units that are split according to depths. Since the largest coding unit according to an embodiment is split according to depths, the image data of a spatial domain included in the largest coding unit may be hierarchically classified according to depths.

A maximum depth and a maximum size of a coding unit, which limit the total number of times a height and a width of the largest coding unit are hierarchically split, may be predetermined.

The coding unit determiner 120 encodes at least one split region obtained by splitting a region of the largest coding unit according to depths, and determines a depth to output a finally encoded image data according to the at least one split region. That is, the coding unit determiner 120 determines an encoding depth by encoding the image data in the deeper coding units according to depths, according to the largest coding unit of the current picture, and selecting a depth having the minimum encoding error. The determined encoding depth and image data according to largest coding units are output to the output unit 130.

The image data in the largest coding unit is encoded based on the deeper coding units corresponding to at least one depth equal to or below the maximum depth, and results of encoding the image data based on each of the deeper coding units are compared. A depth having the minimum encoding error may be selected after comparing encoding errors of the deeper coding units. At least one encoding depth may be selected for each largest coding unit.

The size of the largest coding unit is split as a coding unit is hierarchically split according to depths, and as the number of coding units increases. Also, even if coding units correspond to the same depth in one largest coding unit, it is determined whether to split each of the coding units corresponding to the same depth to a lower depth by measuring an encoding error of the image data of the each coding unit, separately. Accordingly, even when image data is included in one largest coding unit, the encoding errors may differ according to regions in the one largest coding unit, and thus the encoding depths may differ according to regions in the image data. Thus, one or more encoding depths may be determined in one largest coding unit, and the image data of the largest coding unit may be divided according to coding units of at least one encoding depth.

Accordingly, the coding unit determiner 120 according to the embodiment may determine coding units having a tree structure included in the current largest coding unit. The 'coding units having a tree structure' according to an embodiment include coding units corresponding to a depth determined to be the encoding depth, from among all deeper coding units included in the current largest coding unit. A coding unit of an encoding depth may be hierarchically determined according to depths in the same region of the largest coding unit, and may be independently determined in different regions. Equally, an encoding depth in a current region may be independently determined from an encoding depth in another region.

A maximum depth according to an embodiment is an index related to the number of splitting times from a largest coding unit to a smallest coding unit A first maximum depth according to an embodiment may denote the total number of splitting times from the largest coding unit to the smallest coding unit. A second maximum depth according to an embodiment may denote the total number of depth levels from the largest coding unit to the smallest coding unit. For example, when a depth of the largest coding unit is 0, a depth of a coding unit, in which the largest coding unit is split once, may be set to 1, and a depth of a coding unit, in which the largest coding unit is split twice, may be set to 2. In this regard, if the smallest coding unit is a coding unit in which the largest coding unit is split four times, depth levels of depths 0, 1, 2, 3, and 4 exist, and thus the first maximum depth may be set to 4, and the second maximum depth may be set to 5.

Prediction encoding and transformation may be performed according to the largest coding unit. The prediction encoding and the transformation are also performed based on the deeper coding units according to a depth equal to or depths less than the maximum depth, according to the largest coding unit.

Since the number of deeper coding units increases whenever the largest coding unit is split according to depths, encoding, including the prediction encoding and the transformation, is performed on all of the deeper coding units generated as the depth deepens. Hereinafter, for convenience of description, the prediction encoding and the transformation will be described based on a coding unit of a current depth in at least one largest coding unit.

The video encoding apparatus 100 according to the embodiment may variously select a size or shape of a data unit for encoding the image data. In order to encode the image data, operations, such as prediction encoding, transformation, and entropy encoding, are performed, and at this time, the same data unit may be used for all operations or different data units may be used for each operation.

For example, the video encoding apparatus 100 may select not only a coding unit for encoding the image data, but may also select a data unit different from the coding unit so as to perform the prediction encoding on the image data in the coding unit.

In order to perform prediction encoding in the largest coding unit, the prediction encoding may be performed based on a coding unit corresponding to an encoding depth according to an embodiment, i.e., based on a coding unit that is no longer split to coding units corresponding to a lower depth. Hereinafter, the coding unit that is no longer split and becomes a basis unit for prediction encoding will now be referred to as a 'prediction unit'. A partition obtained by splitting the prediction unit may include a prediction unit and a data unit obtained by splitting at least one of a height and a width of the prediction unit. A partition is a data unit where a prediction unit of a coding unit is split, and a prediction unit may be a partition having the same size as a coding unit.

For example, when a coding unit of 2N×2N (where N is a positive integer) is no longer split, it becomes a prediction unit of 2N×2N, and a size of a partition may be 2N×2N, 2N×N, N×2N, or N×N. Examples of a partition type may include symmetrical partitions obtained by symmetrically splitting a height or width of the prediction unit, and may selectively include partitions obtained by asymmetrically splitting the height or width of the prediction unit, such as 1:n or n:1, partitions obtained by geometrically splitting the prediction unit, partitions having arbitrary types, or the like.

A prediction mode of the prediction unit may be at least one of an intra-mode, an inter mode, and a skip mode. For example, the intra-mode and the inter mode may be performed on the partition of 2N×2N, 2N×N, N×2N, or N×N. Also, the skip mode may be performed only on the partition of 2N×2N. The encoding may be independently performed on one prediction unit in a coding unit, so that a prediction mode having a minimum encoding error may be selected.

The video encoding apparatus 100 according to the embodiment may also perform the transformation on the image data in a coding unit based on not only the coding unit for encoding the image data, but also based on a data unit that is different from the coding unit. In order to perform the transformation in the coding unit, the transformation may be performed based on a transformation unit having a size smaller than or equal to the coding unit. For example, the transformation unit may include a data unit for an intra-mode and a transformation unit for an inter mode.

The transformation unit in the coding unit may be recursively split into smaller sized regions in a manner similar to that in which the coding unit is split according to the tree structure, according to an embodiment. Thus, residual data in the coding unit may be split according to the transformation unit having the tree structure according to transformation depths.

A transformation depth indicating the number of splitting times to reach the transformation unit by splitting the height and width of the coding unit may also be set in the transformation unit according to an embodiment. For example, in a current coding unit of 2N×2N, a transformation depth may be 0 when the size of a transformation unit is 2N×2N, may be 1 when the size of the transformation unit is N×N, and may be 2 when the size of the transformation unit is N/2×N/2. That is, with respect to the transformation unit, the transformation unit having the tree structure may be set according to the transformation depths.

Encoding information according to encoding depths requires not only information about an encoding depth but also requires information related to prediction and transformation. Accordingly, the coding unit determiner 120 not only determines an encoding depth having a minimum encoding error but also determines a partition type by which a prediction unit is split to partitions, a prediction mode according to prediction units, and a size of a transformation unit for transformation.

Coding units according to a tree structure in a largest coding unit and methods of determining a prediction unit/partition, and a transformation unit, according to an embodiment, will be described in detail later with reference to FIGS. 7 through 19.

The coding unit determiner 120 may measure an encoding error of deeper coding units according to depths by using Rate-Distortion Optimization based on Lagrangian multipliers.

The output unit 130 outputs, in bitstreams, the image data of the largest coding unit, which is encoded based on the at least one encoding depth determined by the coding unit determiner 120, and encoding mode information according to depths.

The encoded image data may correspond to a result obtained by encoding residual data of an image.

The encoding mode information according to depths may include encoding depth information, partition type information of the prediction unit, prediction mode information, and the size information of the transformation unit.

Encoding-depth information may be defined by using split information according to depths, which specifies whether encoding is performed on coding units of a lower depth instead of a current depth. If the current depth of the current coding unit is an encoding depth, the current coding unit is encoded by using the coding unit of the current depth, and thus split information of the current depth may be defined not to split the current coding unit to a lower depth. On the contrary, if the current depth of the current coding unit is not the encoding depth, the encoding has to be performed on the coding unit of the lower depth, and thus the split information of the current depth may be defined to split the current coding unit to the coding units of the lower depth.

If the current depth is not the encoding depth, encoding is performed on the coding unit that is split into the coding unit of the lower depth. Since at least one coding unit of the lower depth exists in one coding unit of the current depth, the encoding is repeatedly performed on each coding unit of the lower depth, and thus the encoding may be recursively performed on the coding units having the same depth.

Since the coding units having a tree structure are determined for one largest coding unit, and at least one piece of encoding mode information has to be determined for a coding unit of an encoding depth, at least one piece of encoding mode information may be determined for one largest coding unit. A depth of data of the largest coding unit may also vary according to locations since the data is hierarchically split according to encoding depths, and thus the encoding depth and the encoding mode information may be set for the data.

Accordingly, the output unit 130 according to the embodiment may assign encoding information about a corresponding encoding depth and an encoding mode to at least one of the coding unit, the prediction unit, and a minimum unit included in the largest coding unit.

The minimum unit according to an embodiment is a square data unit obtained by splitting the smallest coding unit constituting the lowermost encoding depth by 4. Alternatively, the minimum unit according to an embodiment may be a maximum square data unit that may be included in all of the coding units, prediction units, partition units, and transformation units included in the largest coding unit.

For example, the encoding information output by the output unit 130 may be classified into encoding information according to deeper coding units, and encoding information according to prediction units. The encoding information according to the deeper coding units may include the prediction mode information and the partition size information. The encoding information according to the prediction units may include information about an estimated direction of an inter mode, about a reference image index of the inter mode, about a motion vector, about a chroma component of an intra-mode, and about an interpolation method of the intra-mode.

Information about a maximum size of the coding unit defined according to pictures, slices, or GOPs, and information about a maximum depth may be inserted into a header of a bitstream, a sequence parameter set, or a picture parameter set.

Information about a maximum size of the transformation unit permitted with respect to a current video, and information about a minimum size of the transformation unit may also be output through a header of a bitstream, a sequence parameter set, or a picture parameter set. The output unit 130 may encode and output an offset parameter related to an offset control technique as described above with reference to FIGS. 1 to 7.

According to the simplest embodiment of the video encoding apparatus 100, the deeper coding unit may be a coding unit obtained by dividing a height and width of a coding unit of an upper depth, which is one layer above, by two. That is, when the size of the coding unit of the current depth is 2N×2N, the size of the coding unit of the lower depth is N×N. Also, a current coding unit having a size of 2N×2N may maximally include four lower-depth coding units having a size of N×N.

Accordingly, the video encoding apparatus 100 may form the coding units having the tree structure by determining coding units having an optimum shape and an optimum size for each largest coding unit, based on the size of the largest coding unit and the maximum depth determined considering characteristics of the current picture. Also, since encoding may be performed on each largest coding unit by using any one of various prediction modes and transformations, an optimum encoding mode may be determined by taking into account characteristics of the coding unit of various image sizes.

Thus, if an image having a high resolution or a large data amount is encoded in a conventional macroblock, the number of macroblocks per picture excessively increases. Accordingly, the number of pieces of compressed information generated for each macroblock increases, and thus it is difficult to transmit the compressed information and data compression efficiency decreases. However, by using the video encoding apparatus according to the embodiment, image compression efficiency may be increased since a coding unit is adjusted while considering characteristics of an image while increasing a maximum size of a coding unit while considering a size of the image.

The video encoding apparatus 100 of FIG. 8 may perform an operation of the video encoding apparatus 10 described above with reference to FIG. 1.

The coding unit determiner 120 may perform an operation of the parameter determiner 12 of the video encoding apparatus 10. For each largest coding unit, an offset type, offset values for categories, and an offset class may be determined.

The output unit 130 may perform an operation of the transmitter. An offset parameter determined for each largest coding unit may be output. Offset merge information indicating whether a current offset parameter is to be determined may be first output using an offset parameter of a largest coding unit neighboring to a current largest coding unit. As the offset type, an off type, an edge type, or a band type may be output. The offset values may be output in the order of an absolute offset value and code information. In the case of the edge type, code information of the offset values may not be output. Furthermore, offset class information may be output.

When the offset merge information of the current largest coding unit permits to employ an offset parameter of a neighboring largest coding unit, the offset type and the offset values of the current largest coding unit may not be output.

Figure 9:
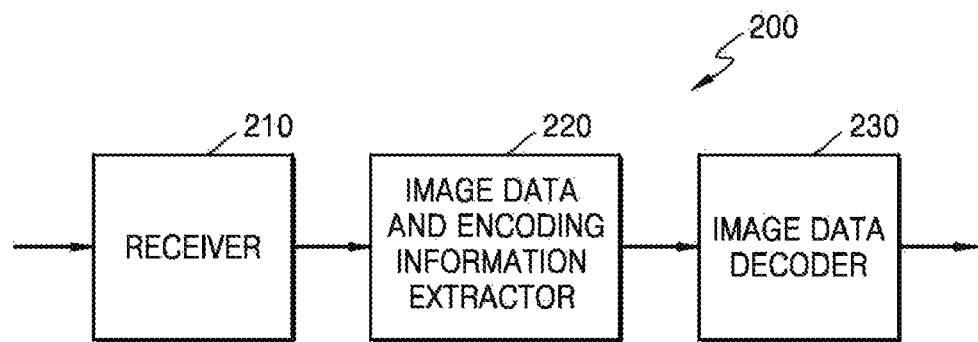
FIG. 9 is a block diagram of a video decoding apparatus based on coding units according to tree structure 200, according to an embodiment of the present disclosure.

FIG. 9 is a block diagram of a video decoding apparatus based on coding units according to tree structure 200, according to an embodiment of the present disclosure.

The video decoding apparatus involving video prediction based on coding units of the tree structure 200 according to the embodiment includes a receiver 210, an image data and encoding information extractor 220, and an image data decoder 230. Hereinafter, for convenience of description, the video decoding apparatus involving video prediction based on coding units of the tree structure 200 according to the embodiment is referred to as the 'video decoding apparatus 200'.

Definitions of various terms, such as a coding unit, a depth, a prediction unit, a transformation unit, and various encoding mode information, for decoding operations of the video decoding apparatus 200 according to an embodiment are identical to those described with reference to FIG. 7 and the video encoding apparatus 100.

The receiver 210 receives and parses a bitstream of an encoded video. The image data and encoding information extractor 220 extracts encoded image data for each coding unit from the parsed bitstream, wherein the coding units have a tree structure according to each largest coding unit, and outputs the extracted image data to the image data decoder 230. The image data and encoding information extractor 220 may extract information about a maximum size of a coding unit of a current picture, from a header about the current picture, a sequence parameter set, or a picture parameter set.

Also, the image data and encoding information extractor 220 extracts, from the parsed bitstream, encoding depth information and encoding mode information with respect to the coding units having a tree structure according to each largest coding unit. The extracted encoding depth information and encoding mode information are output to the image data decoder 230. That is, the image data in a bitstream is split into the largest coding unit so that the image data decoder 230 may decode the image data for each largest coding unit.

Encoding depth information and encoding mode information according to each of the largest coding units may be set for one or more pieces of encoding depth information, and encoding mode information according to encoding depths may include partition type information of a corresponding coding unit, prediction mode information, and size information of a transformation unit. Also, as the encoding depth information, the split information according to depths may be extracted.

The encoding depth information and the encoding mode information according to each of the largest coding units extracted by the image data and encoding information extractor 220 are encoding depth information and encoding mode information determined to generate a minimum encoding error when an encoder, such as the video encoding apparatus 100, repeatedly performs encoding on each deeper coding unit according to depths according to each largest coding unit. Accordingly, the video decoding apparatus 200 may reconstruct an image by decoding data according to an encoding method that generates the minimum encoding error.

Since the encoding depth information and the encoding mode information may be assigned to a predetermined data unit from among a corresponding coding unit, a prediction unit, and a minimum unit, the image data and encoding information extractor 220 may extract the encoding depth information and the encoding mode information according to the predetermined data units. If the encoding depth information and the encoding mode information of a corresponding largest coding unit are recorded according to each of the predetermined data units, predetermined data units having the same depth and the split information may be inferred to be the data units included in the same largest coding unit.

The image data decoder 230 reconstructs the current picture by decoding the image data in each largest coding unit based on the encoding depth information and the encoding mode information according to each of the largest coding units. That is, the image data decoder 230 may decode the encoded image data, based on a read partition type, a prediction mode, and a transformation unit for each coding unit from among the coding units having the tree structure included in each largest coding unit. A decoding process may include a prediction process including intra prediction and motion compensation, and an inverse transformation process.

The image data decoder 230 may perform intra prediction or motion compensation according to a partition and a prediction mode of each coding unit, based on the information about the partition type and the prediction mode of the prediction unit of the coding unit according to encoding depths.

In addition, for inverse transformation for each largest coding unit, the image data decoder 230 may read information about a transformation unit according to a tree structure for each coding unit so as to perform inverse transformation based on transformation units for each coding unit. Due to the inverse transformation, a pixel value of a spatial domain of the coding unit may be reconstructed.

The image data decoder 230 may determine an encoding depth of a current largest coding unit by using split information according to depths. If the split information indicates that image data is no longer split in the current depth, the current depth is an encoding depth. Accordingly, the image data decoder 230 may decode the image data of the current largest coding unit by using the information about the partition type of the prediction unit, the prediction mode, and the size of the transformation unit for each coding unit corresponding to the current depth.

That is, data units containing the encoding information including the same split information may be gathered by observing the encoding information set assigned for the predetermined data unit from among the coding unit, the prediction unit, and the minimum unit, and the gathered data units may be considered to be one data unit to be decoded by the image data decoder 230 in the same encoding mode. As such, the current coding unit may be decoded by obtaining the information about the encoding mode for each coding unit.

The video decoding apparatus 200 of FIG. 9 may perform an operation of the video decoding apparatus 30 described above with reference to FIG. 3.

The image data and encoding information extractor 220 and the receiver 210 may perform an operation of at least one of the parameter extractor 32 and the edge corrector 34 of the video decoding apparatus 30. The image data decoder 230 may perform an operation of the edge corrector 34 of the video decoding apparatus When only offset merge information is parsed from a bitstream without an offset parameter for a current largest coding unit, the image data and encoding information extractor 220 may reconstruct a current offset parameter by using at least one among neighboring offset parameters. For example, the image data and encoding information extractor 220 may reconstruct the current offset parameter to be the same as at least one among the neighboring offset parameters. A parameter to be referred to from among the neighboring offset parameters may be determined on the basis of the offset merge information. The image data and encoding information extractor 220 may reconstruct the current offset parameter for the current largest coding unit by parsing the current offset parameter from the bitstream when it is determined that the neighboring offset parameters and the current offset parameter are different, based on the offset merge information parsed from the bitstream for the current largest coding unit.

The image data and encoding information extractor 220 may parse an absolute offset value and a scale parameter from the bitstream. Furthermore, the image data and encoding information extractor 220 may determine offset values on the basis of the absolute offset value and the scale parameter. For example, the image data and encoding information extractor 220 may determine an offset value by shifting the absolute offset value by the scale parameter.

Alternatively, the image data and encoding information extractor 220 may parse code, an absolute offset value, and a scale parameter from the bitstream. Furthermore, the image data and encoding information extractor 220 may determine offset values on the basis of the code, the absolute offset value, and the scale parameter.

The image data and encoding information extractor 220 may parse an offset parameter for each largest coding unit from the bitstream. An offset type, offset values for categories, and an offset class may be determined on the basis of the offset parameter. When an offset type of a current largest coding unit is an off type, performing an offset control operation on the current largest coding unit may be ended. When the offset type is an edge type, a current offset value may be selected from among received offset values, based on an edge class indicating a direction of an edge of each of reconstructed pixels and a category indicating the type of the edge. When the offset type is a band type, a band for each of the reconstructed pixels may be determined and an offset value corresponding to a current band may be selected from among the offset values.

The image data decoder 230 may produce a reconstructed pixel having a minimum error with respect to an original pixel by adjusting a corresponding reconstructed pixel by an offset value corresponding to the reconstructed pixels. An offset of reconstructed pixels of each largest coding unit may be adjusted on the basis of an offset parameter parsed for each largest coding unit.

Thus, the video decoding apparatus 200 may obtain information about at least one coding unit that generates the minimum encoding error when encoding is recursively performed for each largest coding unit, and may use the information to decode the current picture. That is, the coding units having the tree structure determined to be the optimum coding units in each largest coding unit may be decoded.

Accordingly, even if an image has high resolution or has an excessively large data amount, the image may be efficiently decoded and reconstructed by using a size of a coding unit and an encoding mode, which are adaptively determined according to characteristics of the image, by using optimal encoding mode information received from an encoding terminal.

Figure 10:
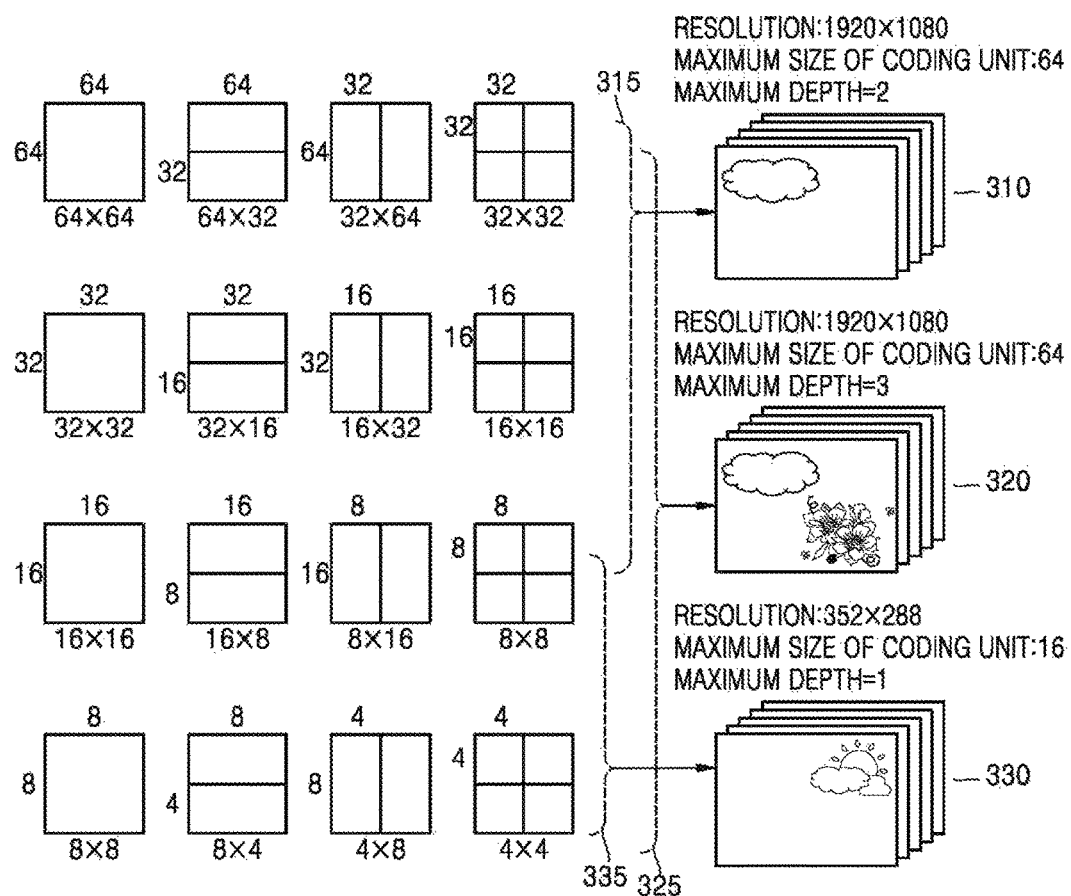
FIG. 10 illustrates a concept of coding units, according to an embodiment of the present disclosure.

FIG. 10 illustrates a concept of coding units, according to an embodiment of the present disclosure.

A size of a coding unit may be expressed by width×height, and may be 64×64, 32×32, 16×16, and 8×8. A coding unit of 64×64 may be split into partitions of 64×64, 64×32, 32×64, or 32×32, and a coding unit of 32×32 may be split into partitions of 32×32, 32×16, 16×32, or 16×16, a coding unit of 16×16 may be split into partitions of 16×16, 16×8, 8×16, or 8×8, and a coding unit of 8×8 may be split into partitions of 8×8, 8×4, 4×8, or 4×4.

In video data 310, a resolution is 1920×1080, a maximum size of a coding unit is 64, and a maximum depth is 2. In video data 320, a resolution is 1920×1080, a maximum size of a coding unit is 64, and a maximum depth is 3. In video data 330, a resolution is 352×288, a maximum size of a coding unit is 16, and a maximum depth is 1. The maximum depth shown in FIG. 10 denotes a total number of splits from a largest coding unit to a smallest coding unit.

If a resolution is high or a data amount is large, it is preferable that a maximum size of a coding unit is large so as to not only increase encoding efficiency but also to accurately reflect characteristics of an image. Accordingly, the maximum size of the coding unit of the video data 310 and 320 having a higher resolution than the video data 330 may be selected to 64.

Since the maximum depth of the video data 310 is 2, coding units 315 of the video data 310 may include a largest coding unit having a long axis size of 64, and coding units having long axis sizes of 32 and 16 since depths are deepened to two layers by splitting the largest coding unit twice. On the other hand, since the maximum depth of the video data 330 is 1, coding units 335 of the video data 330 may include a largest coding unit having a long axis size of 16, and coding units having a long axis size of 8 since depths are deepened to one layer by splitting the largest coding unit once.

Since the maximum depth of the video data 320 is 3, coding units 325 of the video data 320 may include a largest coding unit having a long axis size of 64, and coding units having long axis sizes of 32, 16, and 8 since the depths are deepened to 3 layers by splitting the largest coding unit three times. As a depth deepens, detailed information may be precisely expressed.

Figure 11:
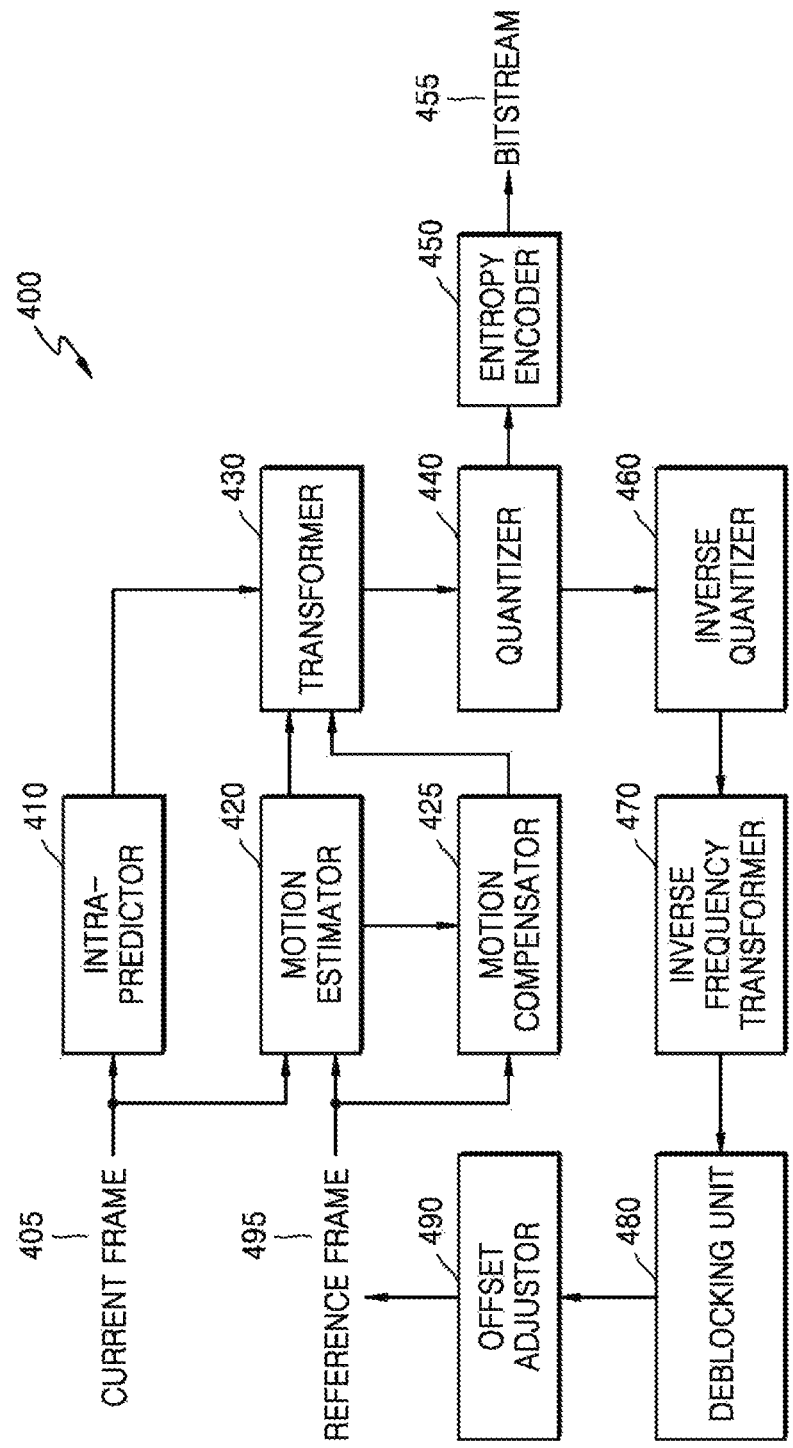
FIG. 11 is a block diagram of an image encoder 400 based on coding units, according to an embodiment of the present disclosure.

FIG. 11 is a block diagram of an image encoder 400 based on coding units, according to an embodiment of the present disclosure.

The image encoder 400 according to an embodiment includes operations of a coding unit determiner 120 of the video encoding apparatus 100 so as to encode image data. That is, an intra-predictor 410 performs intra-prediction on an intra-mode coding unit of a current frame 405, and a motion estimator 420 and a motion compensator 425 performs inter-estimation and motion compensation by using the current frame 405 which is in an inter-mode and a reference frame 495.

Data output from the intra-predictor 410, the motion estimator 420, and the motion compensator 425 passes through a transformer 430 and a quantizer 440 and is then output in the form of a quantized transformation coefficient. The quantized transformation coefficient is reconstructed as spatial-domain data via an inverse quantizer 460 and an inverse frequency transformer 470. The spatial-domain data is post-processed by passing through a deblocking unit 480 and a offset adjustor 490 and is then output in the form of the reference frame 495. The quantized transformation coefficient may pass through an entropy encoder 450 and be then output in the form of a bitstream 455.

In order to be applied to the video encoding apparatus 100 according to an embodiment, all the intra-predictor 410, the motion estimator 420, the motion compensator 425, the transformer 430, the quantizer 440, the entropy encoder 450, the inverse quantizer 460, the inverse frequency transformer 470, the deblocking unit 480, and the offset adjustor 490 which are components of the image encoder 400 may perform an operation on the basis of each of coding units of a tree structure while considering a maximum depth for each largest coding unit.

In particular, the intra-predictor 410, the motion estimator 420 and the motion compensator 425 may determine a partition and a prediction mode of each of the coding units of the tree structure by considering a maximum size and a maximum depth of a current largest coding unit, and the transformer 430 may determine a size of a transformation unit in each of the coding units of the tree structure.

The image encoder 400 may classify pixels of each of largest coding units of the reference frame 495 according to an edge type (or a band type), determine a direction of an edge (or a location of a starting band), and determine an average error value of reconstructed pixels belonging to each category. For each largest coding unit, offset merge information, offset type, and offset values may be encoded and signaled.

Figure 12:
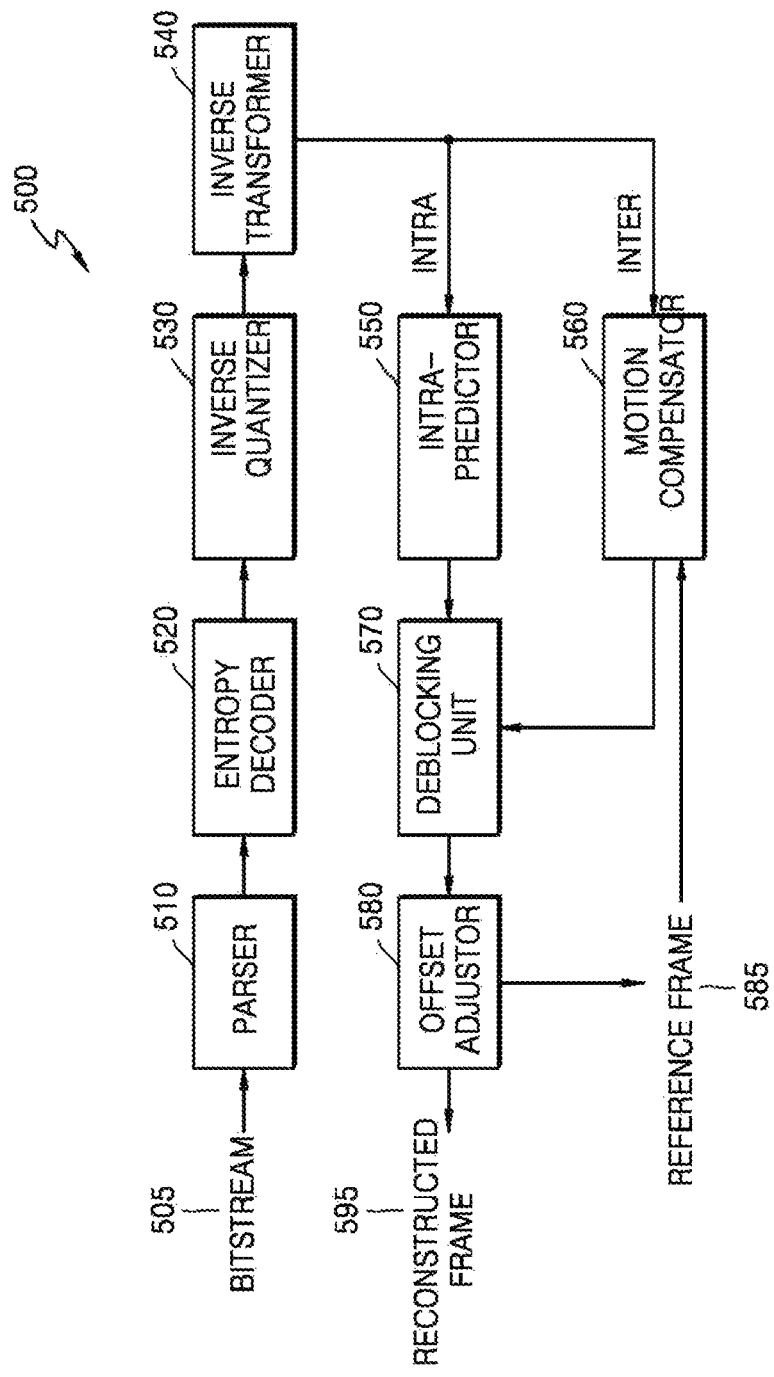
FIG. 12 is a block diagram of an image decoder 500 based on coding units, according to an embodiment of the present disclosure.

FIG. 12 is a block diagram of an image decoder 500 based on coding units according to an embodiment of the present disclosure.

Encoded image data which is a decoding target and encoding information which is needed to perform decoding are parsed when a bitstream 505 passes through a parser 510. The encoded image data passes through an entropy decoder 520 and an inverse quantizer 530, is output in the form of inversely quantized data, and then passes through an inverse transformer 540 to reconstruct spatial-domain image data.

An intra-predictor 550 performs intra-prediction on an intra-mode coding unit of the spatial-domain image data. A motion compensator 560 performs motion compensation on the inter-mode coding unit by using a reference frame 585.

The spatial-domain image data passing through the intra-predictor 550 and the motion compensator 560 may be post-processed by passing through a deblocking unit 570 and a offset adjustor 580 and be then output in the form of a reconstructed frame 595. Alternatively, the spatial-domain image data post-processed by passing through the deblocking unit 570 and the offset adjustor 580 may be output in the form of the reference frame 585.

In order to decode image data by the image data decoder 230 of the video decoding apparatus 200, operations subsequent to an operation of the parser 510 of the image decoder 500 according to an embodiment may be sequentially performed.

In order to be applied to the video decoding apparatus 200 according to an embodiment, all the parser 510, the entropy decoder 520, the inverse quantizer 530, the inverse transformer 540, the intra-predictor 550, the motion compensator 560, the deblocking unit 570 and the offset adjustor 580 which are components of the image decoder 500 may perform operations on the basis of coding units of a tree structure for each largest coding unit.

In particular, the intra-predictor 550 and the motion compensator 560 may determine a partition and a prediction mode of each of the coding units of the tree structure, and the inverse transformer 540 may determine a size of a transformation unit for each of the coding units.

The image decoder 500 may extract an offset parameter for largest coding units from a bitstream. A current offset parameter may be reconstructed using an offset parameter of a neighboring largest coding unit on the basis of offset merge information of an offset parameter of a current largest coding unit. For example, the current offset parameter may be reconstructed to be the same as the offset parameter of the neighboring largest coding unit. Each of reconstructed pixels of each largest coding unit of the reconstructed frame 595 may be adjusted by an offset value corresponding to a category according to edge type or band type by using offset type and offset values of the offset parameter of the current largest coding unit.

Figure 13:
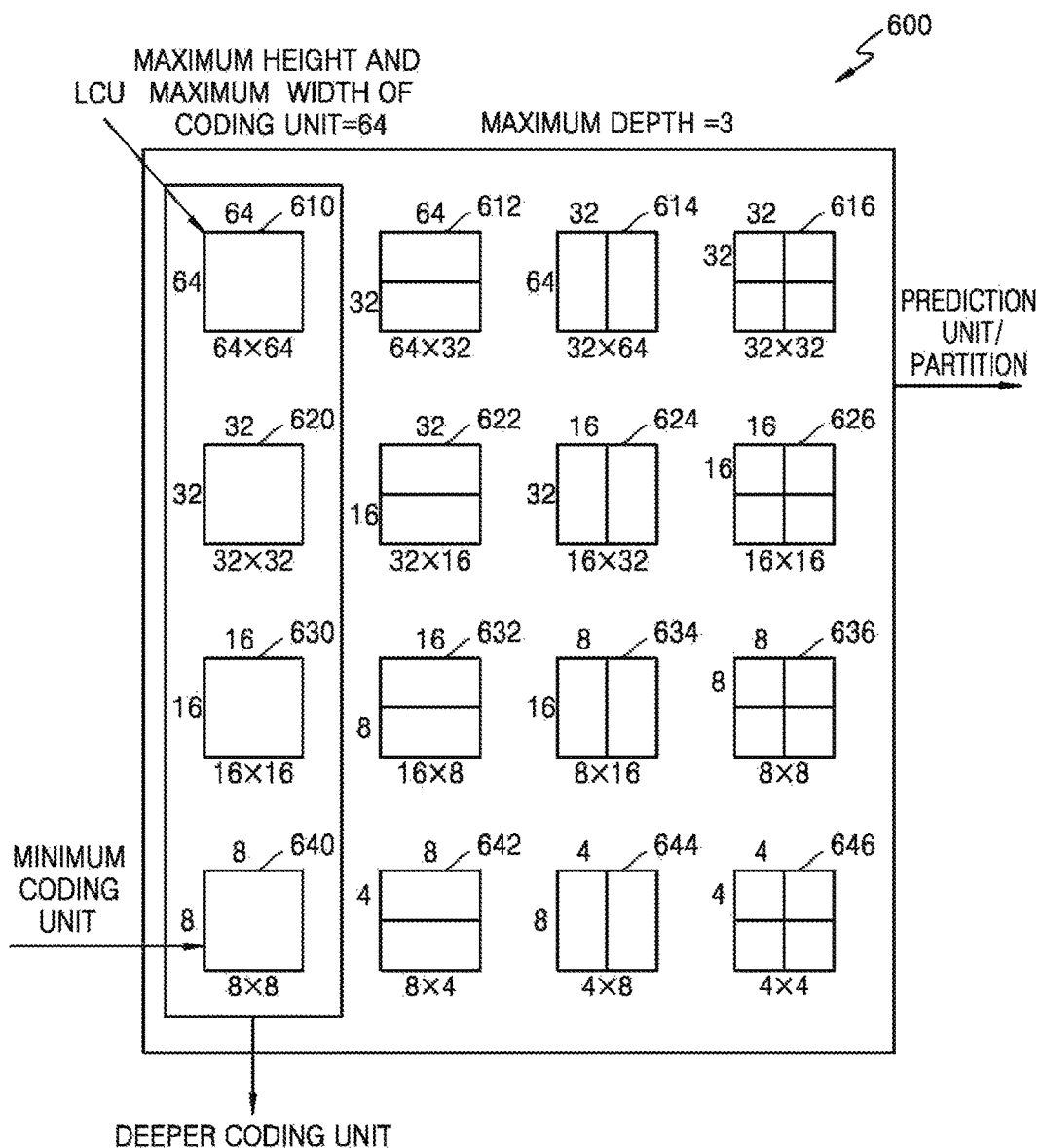
FIG. 13 illustrates deeper coding units according to depths, and partitions, according to an embodiment of the present disclosure.

FIG. 13 illustrates deeper coding units according to depths, and partitions, according to an embodiment of the present disclosure.

The video encoding apparatus 100 according to an embodiment and the image decoding apparatus 200 according to an embodiment use hierarchical coding units so as to consider characteristics of an image. A maximum height, a maximum width, and a maximum depth of coding units may be adaptively determined according to the characteristics of the image, or may be variously set according to user requirements. Sizes of deeper coding units according to depths may be determined according to the predetermined maximum size of the coding unit.

In a hierarchical structure of coding units 600 according to an embodiment, the maximum height and the maximum width of the coding units are each 64, and the maximum depth is 4. In this case, the maximum depth refers to a total number of times the coding unit is split from the largest coding unit to the smallest coding unit. Since a depth deepens along a vertical axis of the hierarchical structure of coding units 600, a height and a width of the deeper coding unit are each split. Also, a prediction unit and partitions, which are bases for prediction encoding of each deeper coding unit, are shown along a horizontal axis of the hierarchical structure of coding units 600.

That is, a coding unit 610 is a largest coding unit in the hierarchical structure of coding units 600, wherein a depth is 0 and a size, i.e., a height by width, is 64×64. The depth deepens along the vertical axis, and a coding unit 620 having a size of 32×32 and a depth of 1, a coding unit 630 having a size of 16×16 and a depth of 2, and a coding unit 640 having a size of 8×8 and a depth of 3 are present. The coding unit 640 having a size of 4×4 and a depth of 3 is a smallest coding unit.

The prediction unit and the partitions of a coding unit are arranged along the horizontal axis according to each depth. That is, if the coding unit 610 having a size of 64×64 and a depth of 0 is a prediction unit, the prediction unit may be split into partitions included in the coding unit 610 having the size of 64×64, i.e. a partition 610 having a size of 64×64, partitions 612 having the size of 64×32, partitions 614 having the size of 32×64, or partitions 616 having the size of 32×32.

Equally, a prediction unit of the coding unit 620 having the size of 32×32 and the depth of 1 may be split into partitions included in the coding unit 620, i.e. a partition 620 having a size of 32×32, partitions 622 having a size of 32×16, partitions 624 having a size of 16×32, and partitions 626 having a size of 16×16.

Equally, a prediction unit of the coding unit 630 having the size of 16×16 and the depth of 2 may be split into partitions included in the coding unit 630, i.e. a partition having a size of 16×16 included in the coding unit 630, partitions 632 having a size of 16×8, partitions 634 having a size of 8×16, and partitions 636 having a size of 8×8.

Equally, a prediction unit of the coding unit 640 having the size of 8×8 and the depth of 3 may be split into partitions included in the coding unit 640, i.e. a partition 640 having a size of 8×8 included in the coding unit 640, partitions 642 having a size of 8×4, partitions 644 having a size of 4×8, and partitions 646 having a size of 4×4.

In order to determine an encoding depth of the largest coding unit 610, the coding unit determiner 120 of the video encoding apparatus 100 has to perform encoding on coding units respectively corresponding to depths included in the largest coding unit 610.

The number of deeper coding units according to depths including data in the same range and the same size increases as the depth deepens. For example, four coding units corresponding to a depth of 2 are required to cover data that is included in one coding unit corresponding to a depth of 1. Accordingly, in order to compare results of encoding the same data according to depths, the data has to be encoded by using each of the coding unit corresponding to the depth of 1 and four coding units corresponding to the depth of 2.

In order to perform encoding according to each of the depths, a minimum encoding error that is a representative encoding error of a corresponding depth may be selected by performing encoding on each of prediction units of the coding units according to depths, along the horizontal axis of the hierarchical structure of coding units 600. Also, the minimum encoding error may be searched for by comparing representative encoding errors according to depths, by performing encoding for each depth as the depth deepens along the vertical axis of the hierarchical structure of coding units 600. A depth and a partition generating the minimum encoding error in the largest coding unit 610 may be selected as an encoding depth and a partition type of the largest coding unit 610.

Figure 14:
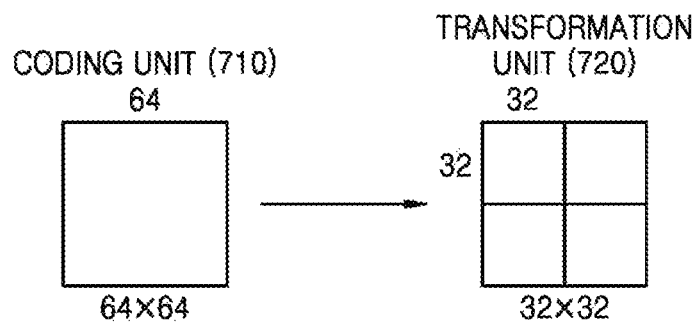
FIG. 14 illustrates a relationship between a coding unit and transformation units, according to an embodiment of the present disclosure.

FIG. 14 illustrates a relationship between a coding unit and transformation units, according to an embodiment of the present disclosure.

The video encoding apparatus 100 according to an embodiment or the video decoding apparatus 200 according to an embodiment encodes or decodes an image according to coding units having sizes smaller than or equal to a largest coding unit for each largest coding unit. Sizes of transformation units for transformation during an encoding process may be selected based on data units that are not larger than a corresponding coding unit.

For example, in the video encoding apparatus 100 or the video decoding apparatus 200, when a size of the coding unit 710 is 64×64, transformation may be performed by using the transformation units 720 having a size of 32×32.

Also, data of the coding unit 710 having the size of 64×64 may be encoded by performing the transformation on each of the transformation units having the size of 32×32, 16×16, 8×8, and 4×4, which are smaller than 64×64, and then a transformation unit having the minimum coding error with respect to an original image may be selected.

Figure 15:
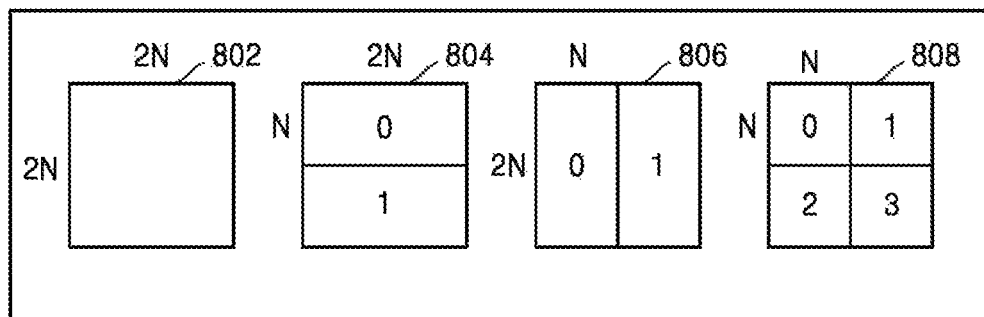
FIG. 15 illustrates a plurality of pieces of encoding information according to depths, according to an embodiment of the present disclosure.
Figure 15:
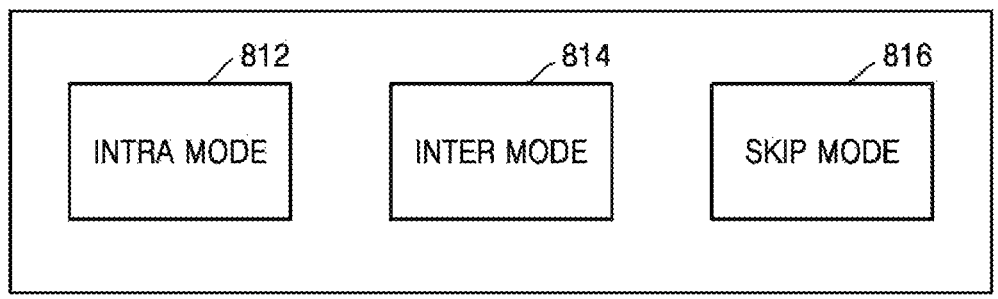
Figure 15:
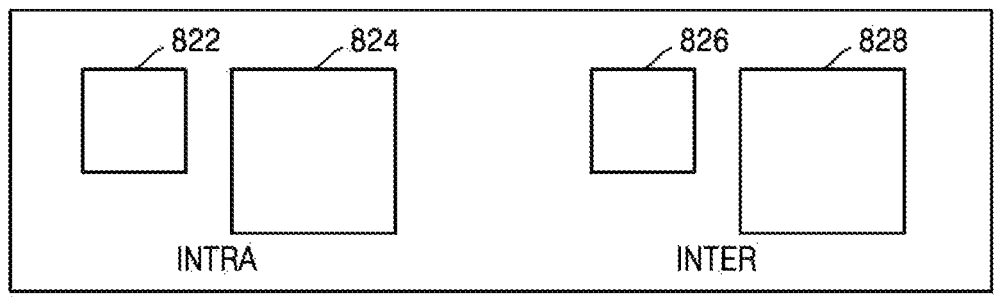

FIG. 15 illustrates a plurality of pieces of encoding information according to depths, according to an embodiment of the present disclosure.

The output unit 130 of the video encoding apparatus 100 according to an embodiment may encode and transmit, as encoding mode information, partition type information 800, prediction mode information 810, and transformation unit size information 820 for each coding unit corresponding to an encoding depth.

The partition type information 800 indicates information about a type of a partition obtained by splitting a prediction unit of a current coding unit, wherein the partition is a data unit for prediction encoding the current coding unit. For example, a current coding unit CU_0 having a size of 2N×2N may be split into any one of a partition 802 having a size of 2N×2N, a partition 804 having a size of 2N×N, a partition 806 having a size of N×2N, and a partition 808 having a size of N×N. In this case, the partition type information 800 about a current coding unit is set to indicate one of the partition 802 having a size of 2N×2N, the partition 804 having a size of 2N×N, the partition 806 having a size of N×2N, and the partition 808 having a size of N×N.

The prediction mode information 810 indicates a prediction mode of each partition. For example, the prediction mode information 810 may indicate a mode of prediction encoding performed on a partition indicated by the partition type information 800, i.e., an intra-mode 812, an inter mode 814, or a skip mode 816.

The transformation unit size information 820 represents a transformation unit to be based on when transformation is performed on a current coding unit. For example, the transformation unit may be one of a first intra transformation unit 822, a second intra transformation unit 824, a first inter transformation unit 826, and a second intra transformation unit 828.

The image data and encoding information receiver 210 of the video decoding apparatus 200 may extract and use the partition type information 800, the prediction mode information 810, and the transformation unit size information 820 for each deeper coding unit.

Figure 16:
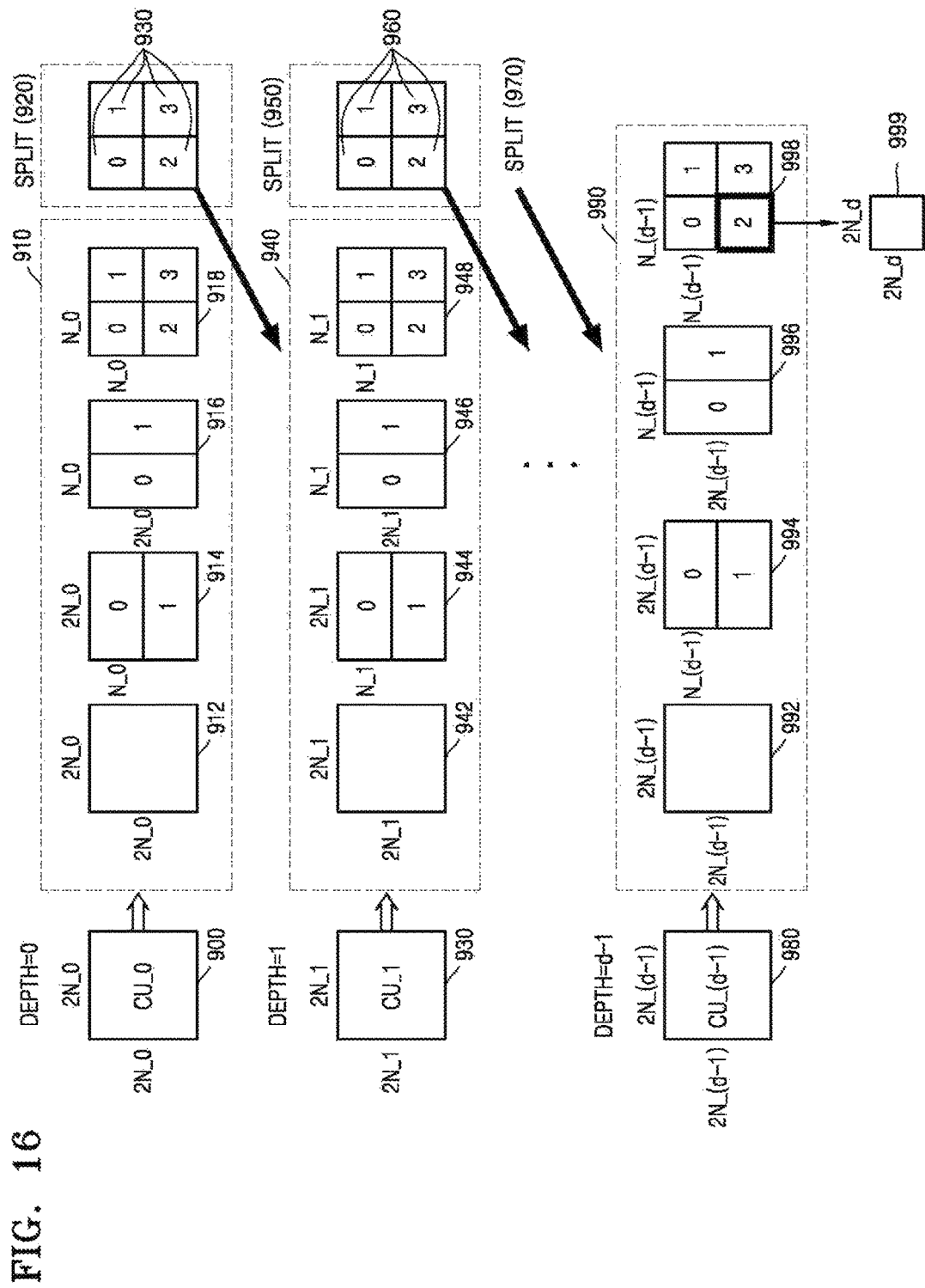
FIG. 16 illustrates deeper coding units according to depths, according to an embodiment of the present disclosure.

FIG. 16 illustrates deeper coding units according to depths, according to an embodiment of the present disclosure.

Split information may be used to represent a change in a depth. The spilt information indicates whether a coding unit of a current depth is split into coding units of a lower depth.

A prediction unit 910 for prediction encoding a coding unit 900 having a depth of 0 and a size of 2N_0×2N_0 may include partitions of a partition type 912 having a size of 2N_0×2N_0, a partition type 914 having a size of 2N_0×N_0, a partition type 916 having a size of N_0×2N_0, and a partition type 918 having a size of N_0×N_0. Only the partition types 912, 914, 916, and 918 which are obtained by symmetrically splitting the prediction unit are illustrated, but as described above, a partition mode is not limited thereto and may include asymmetrical partitions, partitions having a predetermined shape, and partitions having a geometrical shape.

According to each partition type, prediction encoding has to be repeatedly performed on one partition having a size of 2N_0×2N_0, two partitions having a size of 2N_0×N_0, two partitions having a size of N_0×2N_0, and four partitions having a size of N_0×N_0. The prediction encoding in an intra-mode and an inter mode may be performed on the partitions having the sizes of 2N_0×2N_0, N_0×2N_0, 2N_0×N_0, and N_0×N_0. The prediction encoding in a skip mode may be performed only on the partition having the size of 2N_0×2N_0.

If an encoding error is smallest in one of the partition types 912, 914, and 916 having the sizes of 2N_0×2N_0, 2N_0×N_0 and N_0×2N_0, the prediction unit 910 may not be split into a lower depth.

If the encoding error is the smallest in the partition type 918 having the size of N_0×N_0, a depth is changed from 0 to 1 and split is performed (operation 920), and encoding may be repeatedly performed on coding units 930 of a partition type having a depth of 2 and a size of N_0×N_0 so as to search for a minimum encoding error.

A prediction unit 1640 for prediction encoding the coding unit 1630 having a depth of 1 and a size of 2N_1× 2N_1 (=N_0×N_0) may include a partition type 1642 having a size of 2N_1×2N_1, a partition type 1644 having a size of 2N_1×N_1, a partition type 1646 having a size of N_1× 2N_1, and a partition type 1648 having a size of N_1×N_1.

If an encoding error is the smallest in the partition type 948 having the size of N_1×N_1, a depth is changed from 1 to 2 and split is performed (in operation 950), and encoding is repeatedly performed on coding units 960 having a depth of 2 and a size of N_2×N_2 so as to search for a minimum encoding error.

When a maximum depth is d, deeper coding units according to depths may be set until when a depth corresponds to d−1, and split information may be set until when a depth corresponds to d−2. That is, when encoding is performed up to when the depth is d−1 after a coding unit corresponding to a depth of d−2 is split (in operation 970), a prediction unit 990 for prediction encoding a coding unit 980 having a depth of d−1 and a size of 2N_(d−1)×2N_(d−1) may include partitions of a partition type 992 having a size of 2N_(d−1)×2N_(d−1), a partition type 994 having a size of 2N_(d−1)×N_(d−1), a partition type 996 having a size of N_(d−1)× 2N_(d−1), and a partition type 998 having a size of N_(d−1)×N_(d−1).

Prediction encoding may be repeatedly performed on one partition having a size of 2N_(d−1)×2N_(d−1), two partitions having a size of 2N_(d−1)×N_(d−1), two partitions having a size of N_(d−1)×2N_(d−1), four partitions having a size of N_(d−1)×N_(d−1) from among the partition types so as to search for a partition type generating a minimum encoding error.

Even when the partition type 998 having the size of N_(d−1)×N_(d−1) has the minimum encoding error, since a maximum depth is d, a coding unit CU_(d−1) having a depth of d−1 is no longer split into a lower depth, and an encoding depth for the coding units constituting a current largest coding unit 900 is determined to be d−1 and a partition type of the current largest coding unit 900 may be determined to be N_(d−1)×N_(d−1). Also, since the maximum depth is d, split information for a coding unit 952 having a depth of d−1 is not set.

A data unit 999 may be a 'minimum unit' for the current largest coding unit. A minimum unit according to the embodiment may be a square data unit obtained by splitting a smallest coding unit having a lowermost encoding depth by 4. By performing the encoding repeatedly, the video encoding apparatus 100 according to the embodiment may select a depth generating the minimum encoding error by comparing encoding errors according to depths of the coding unit 900 to determine an encoding depth, and may set a corresponding partition type and a prediction mode as an encoding mode of the encoding depth.

As such, the minimum encoding errors according to depths are compared in all of the depths of 0, 1, . . . , d−1, d, and a depth having a minimum encoding error may be determined as an encoding depth. The encoding depth, the partition type of the prediction unit, and the prediction mode may be encoded and transmitted as information about the encoding mode. Since a coding unit has to be split from a depth of 0 to an encoding depth, only split information of the encoding depth is also set to '0', and split information of depths excluding the encoding depth is also set to '1'.

The image data and encoding information extractor 220 of the video decoding apparatus 200 according to the embodiment may extract and use encoding depth information and prediction unit information about the coding unit 900 so as to decode the coding unit 912. The video decoding apparatus 200 according to an embodiment may determine a depth, in which split information is '0', as an encoding depth by using encoding mode information according to depths, and may use, for decoding, encoding mode information about the corresponding depth.

Figure 17:
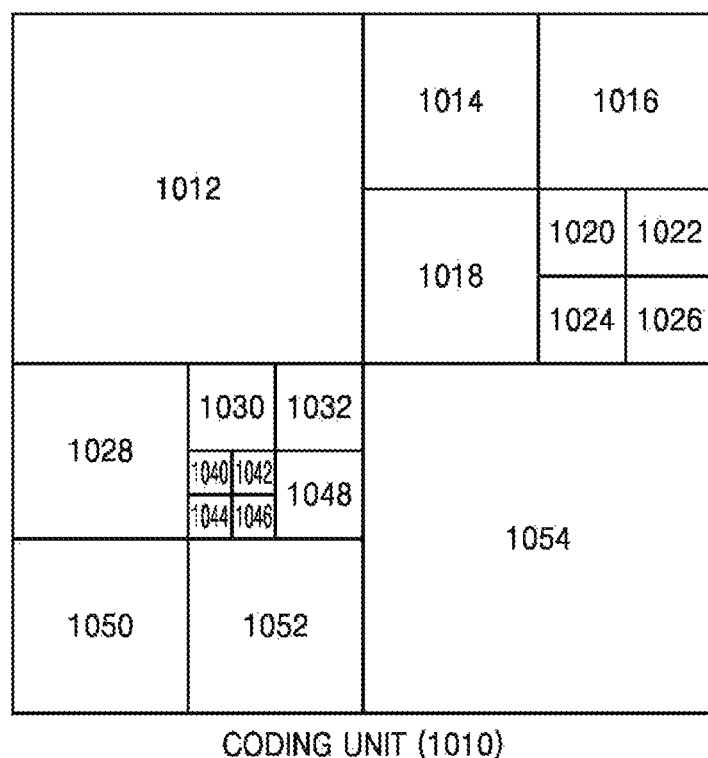
FIG. 17 illustrates a relationship between coding units, prediction units, and transformation units, according to an embodiment of the present disclosure.
Figure 18:
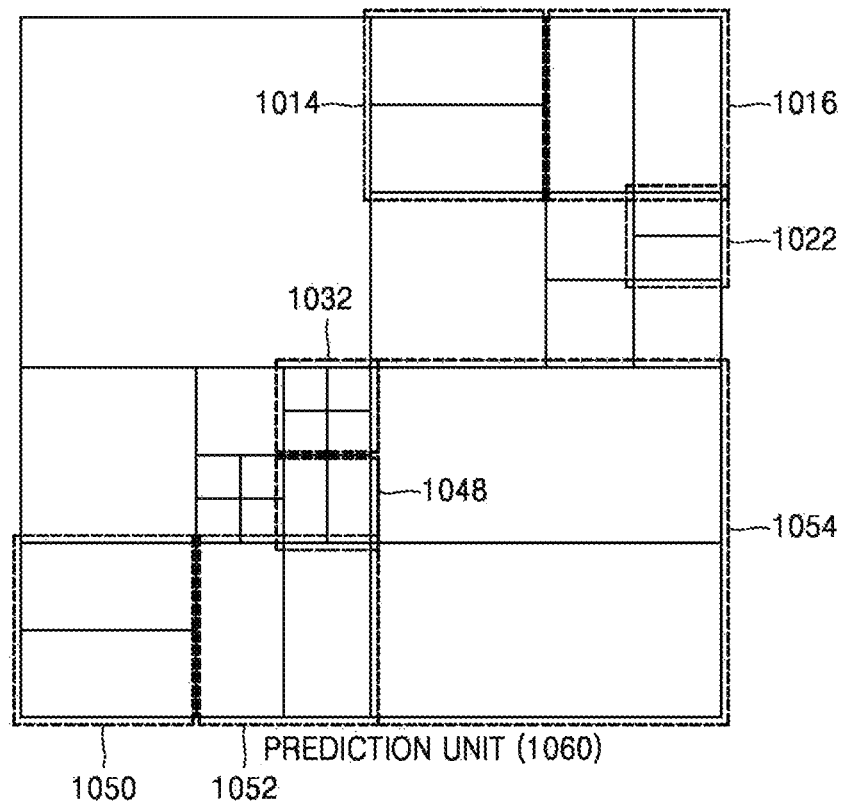
FIG. 18 illustrates a relationship between coding units, prediction units, and transformation units, according to an embodiment of the present disclosure.
Figure 19:
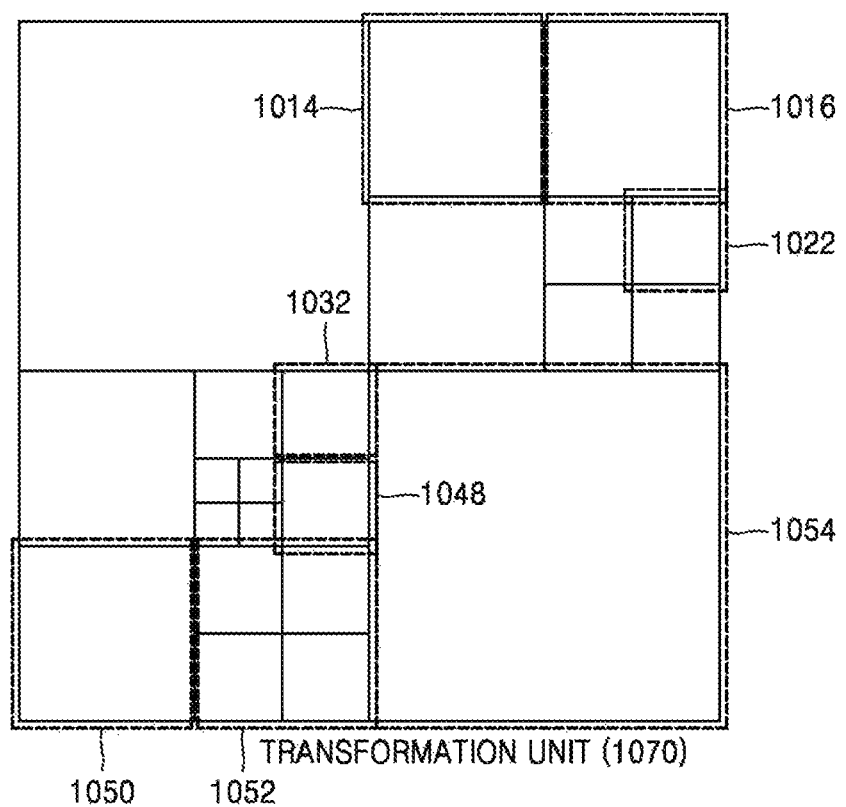
FIG. 19 illustrates a relationship between coding units, prediction units, and transformation units, according to an embodiment of the present disclosure.

FIGS. 17, 18, and 19 illustrate a relationship between coding units, prediction units, and transformation units, according to an embodiment of the present disclosure.

Coding units 1010 are deeper coding units according to encoding depths determined by the video encoding apparatus 100, in a largest coding unit. Prediction units 1060 are partitions of prediction units of each of the coding units 1010 according to encoding depths, and transformation units 1070 are transformation units of each of the coding units according to encoding depths.

When a depth of a largest coding unit is 0 in the deeper coding units 1010, depths of coding units 1012 and 1054 are 1, depths of coding units 1014, 1016, 1018, 1028, 1050, and 1052 are 2, depths of coding units 1020, 1022, 1024, 1026, 1030, 1032, and 1048 are 3, and depths of coding units 1040, 1042, 1044, and 1046 are 4.

Some partitions 1014, 1016, 1022, 1032, 1048, 1050, 1052, and 1054 from among the prediction units 1060 are obtained by splitting the coding unit. That is, partitions 1014, 1022, 1050, and 1054 are a partition type having a size of 2N×N, partitions 1016, 1048, and 1052 are a partition type having a size of N×2N, and a partition 1032 is a partition type having a size of N×N. Prediction units and partitions of the deeper coding units 1010 are smaller than or equal to each coding unit.

Transformation or inverse transformation is performed on image data of the coding unit 1052 in the transformation units 1070 in a data unit that is smaller than the coding unit 1052. Also, the coding units 1014, 1016, 1022, 1032, 1048, 1050, 1052, and 1054 in the transformation units 1760 are data units different from those in the Prediction units 1060 in terms of sizes and shapes. That is, the video encoding apparatus 100 and the video decoding apparatus 200 according to the embodiments may perform intra prediction/motion estimation/motion compensation/and transformation/inverse transformation on an individual data unit in the same coding unit.

Accordingly, encoding is recursively performed on each of coding units having a hierarchical structure in each region of a largest coding unit so as to determine an optimum coding unit, and thus coding units according to a recursive tree structure may be obtained. Encoding information may include split information about a coding unit, partition type information, prediction mode information, and transformation unit size information. Table 1 below shows the encoding information that may be set by the video encoding apparatus 100 and the video decoding apparatus 200 according to the embodiments.

TABLE 1

| Split Information 0 (Encoding on Coding Unit having Size of 2N × 2N and Current Depth of d) | | | | | Split Information 1 |
|---|---|---|---|---|---|
| Prediction Mode | Partition Type | | Size of Transformation Unit | | Repeatedly |
| Intra Inter Skip (Only 2N × 2N) | Symmetrical Partition Type | Asymmetrical Partition Type | Split Information 0 of Transformation Unit | Split Information 1 of Transformation Unit | Encode Coding Units having Lower Depth of d + 1 |
| | 2N × 2N 2N × N N × 2N N × N | 2N × nU 2N × nD nL × 2N nR × 2N | 2N × 2N | N × N (Symmetrical Partition Type) N/2 × N/2 (Asymmetrical Partition Type) | |

The output unit 130 of the video encoding apparatus 100 according to the embodiment may output the encoding information about the coding units having a tree structure, and the image data and encoding information extractor 220 of the video decoding apparatus 200 according to the embodiment may extract the encoding information about the coding units having a tree structure from a received bitstream.

Split information indicates whether a current coding unit is split into coding units of a lower depth. If split information of a current depth d is 0, a depth, in which a current coding unit is no longer split into a lower depth, is an encoding depth, and thus partition type information, prediction mode information, and transformation unit size information may be defined for the encoding depth. If the current coding unit has to be further split according to the split information, encoding has to be independently performed on each of four split coding units of a lower depth.

A prediction mode may be one of an intra-mode, an inter mode, and a skip mode. The intra-mode and the inter mode may be defined in all partition types, and the skip mode may be defined only in a partition type having a size of 2N×2N.

The partition type information may indicate symmetrical partition types having sizes of 2N×2N, 2N×N, N×2N, and N×N, which are obtained by symmetrically splitting a height or a width of a prediction unit, and asymmetrical partition types having sizes of 2N×nU, 2N×nD, nL×2N, and nR×2N, which are obtained by asymmetrically splitting the height or width of the prediction unit. The asymmetrical partition types having the sizes of 2N×nU and 2N×nD may be respectively obtained by splitting the height of the prediction unit in 1:3 and 3:1, and the asymmetrical partition types having the sizes of nL×2N and nR×2N may be respectively obtained by splitting the width of the prediction unit in 1:3 and 3:1.

The size of the transformation unit may be set to be two types in the intra-mode and two types in the inter mode. That is, if split information of the transformation unit is 0, the size of the transformation unit may be 2N×2N, which is the size of the current coding unit. If split information of the transformation unit is 1, the transformation units may be obtained by splitting the current coding unit. Also, if a partition type of the current coding unit having the size of 2N×2N is a symmetrical partition type, a size of a transformation unit may be N×N, and if the partition type of the current coding unit is an asymmetrical partition type, the size of the transformation unit may be N/2×N/2.

The encoding information about coding units having a tree structure, according to an embodiment, may include at least one of a coding unit corresponding to an encoding depth, a prediction unit, and a minimum unit. The coding unit corresponding to the encoding depth may include at least one of a prediction unit and a minimum unit containing the same encoding information.

Accordingly, it is determined whether adjacent data units are included in the coding unit corresponding to the same encoding depth by comparing a plurality of pieces of encoding information of the adjacent data units. Also, a corresponding coding unit corresponding to an encoding depth is determined by using encoding information of a data unit, and thus a distribution of encoding depths in a largest coding unit may be inferred.

Accordingly, if a current coding unit is predicted based on adjacent data units, encoding information of data units in deeper coding units adjacent to the current coding unit may be directly referred to and used.

In another embodiment, if a current coding unit is prediction-encoded based on adjacent data units, the adjacent data units may be referred to in a manner that data adjacent to the current coding unit is searched for in deeper coding units by using encoding information of the deeper coding units adjacent to the current coding unit.

Figure 20:
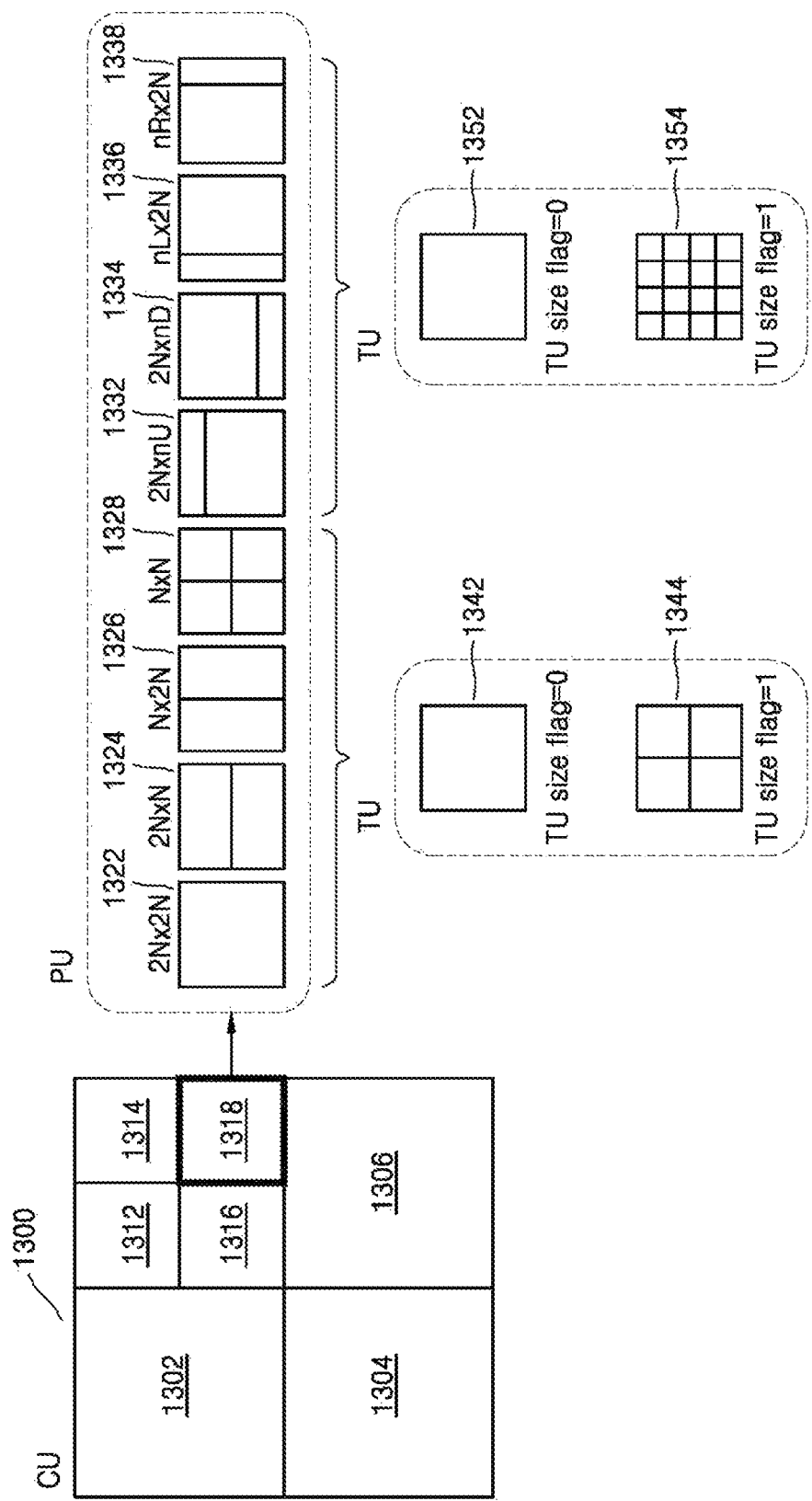
FIG. 20 illustrates a relationship between a coding unit, a prediction unit, and a transformation unit, according to encoding mode information of Table 1.

FIG. 20 illustrates a relationship between a coding unit, a prediction unit, and a transformation unit, according to encoding mode information of Table 1.

A largest coding unit 1300 includes coding units 1302, 1304, 1306, 1312, 1314, 1316, and 1318 of encoding depths. Here, since the coding unit 1318 is a coding unit of an encoding depth, split information may be set to 0. Partition type information of the coding unit 1318 having a size of 2N×2N may be set to be one of partition types including 2N×2N 1322, 2N×N 1324, N×2N 1326, N×N 1328, 2N×nU 1332, 2N×nD 1334, nL×2N 1336, and nR×2N 1338.

Transformation unit split information (TU size flag) is a type of a transformation index, and a size of a transformation unit corresponding to the transformation index may be changed according to a prediction unit type or partition type of the coding unit.

For example, when the partition type information is set to be one of symmetrical partition types 2N×2N 1322, 2N×N 1324, N×2N 1326, and N×N 1328, if the transformation unit split information is 0, a transformation unit 1342 having a size of 2N×2N is set, and if the transformation unit split information is 1, a transformation unit 1344 having a size of N×N may be set.

When the partition type information is set to be one of asymmetrical partition types 2N×nU 1332, 2N×nD 1334, nL×2N 1336, and nR×2N 1338, if the transformation unit split information (TU size flag) is 0, a transformation unit 1352 having a size of 2N×2N may be set, and if the transformation unit split information is 1, a transformation unit 1354 having a size of N/2×N/2 may be set.

The transformation unit split information (TU size flag) described above with reference to FIG. 20 is a flag having a value of 0 or 1, but the transformation unit split information according to an embodiment is not limited to a flag having 1 bit, and the transformation unit may be hierarchically split while the transformation unit split information increases in a manner of 0, 1, 2, 3 . . . etc., according to setting. The transformation unit split information may be an example of the transformation index.

In this case, the size of a transformation unit that has been actually used may be expressed by using the transformation unit split information according to the embodiment, together with a maximum size of the transformation unit and a minimum size of the transformation unit. The video encoding apparatus 100 according to the embodiment may encode maximum transformation unit size information, minimum transformation unit size information, and maximum transformation unit split information. The result of encoding the maximum transformation unit size information, the minimum transformation unit size information, and the maximum transformation unit split information may be inserted into an SPS. The video decoding apparatus 200 according to the embodiment may decode video by using the maximum transformation unit size information, the minimum transformation unit size information, and the maximum transformation unit split information.

For example, (a) if the size of a current coding unit is 64×64 and a maximum transformation unit size is 32×32, (a-1) then the size of a transformation unit may be 32×32 when a TU size flag is 0, (a-2) may be 16×16 when the TU size flag is 1, and (a-3) may be 8×8 when the TU size flag is 2.

As another example, (b) if the size of the current coding unit is 32×32 and a minimum transformation unit size is 32×32, (b-1) then the size of the transformation unit may be 32×32 when the TU size flag is 0. Here, the TU size flag cannot be set to a value other than 0, since the size of the transformation unit cannot be less than 32×32.

As another example, (c) if the size of the current coding unit is 64×64 and a maximum TU size flag is 1, then the TU size flag may be 0 or 1. Here, the TU size flag cannot be set to a value other than 0 or 1.

Thus, if it is defined that the maximum TU size flag is 'MaxTransformSizeIndex', a minimum transformation unit size is 'MinTransformSize', and a transformation unit size is 'RootTuSize' when the TU size flag is 0, then a current minimum transformation unit size 'CurrMinTuSize' that can be determined in a current coding unit may be defined by Equation (5):

$$CurrMinTuSize = \max(MinTransformSize, RootTuSize/(2^{\wedge}MaxTransformSizeIndex)) \quad (5)$$

Compared to the current minimum transformation unit size 'CurrMinTuSize' that can be determined in the current coding unit, a transformation unit size 'RootTuSize' when the TU size flag is 0 may denote a maximum transformation unit size that can be selected in the system. That is, in Equation (5), 'RootTuSize/(2^MaxTransformSizeIndex)' denotes a transformation unit size when the transformation unit size 'RootTuSize', when the TU size flag is 0, is split by the number of times corresponding to the maximum TU size flag, and 'MinTransformSize' denotes a minimum transformation size. Thus, a smaller value from among 'RootTuSize/(2^MaxTransformSizeIndex)' and 'MinTransformSize' may be the current minimum transformation unit size 'CurrMinTuSize' that can be determined in the current coding unit.

According to an embodiment, the maximum transformation unit size RootTuSize may vary according to the type of a prediction mode.

For example, if a current prediction mode is an inter mode, then 'RootTuSize' may be determined by using Equation (6) below. In Equation (6), 'MaxTransformSize' denotes a maximum transformation unit size, and 'PUSize' denotes a current prediction unit size.

$$RootTuSize = \min(MaxTransformSize, PUSize) \quad (6)$$

That is, if the current prediction mode is the inter mode, the transformation unit size 'RootTuSize', when the TU size flag is 0, may be a smaller value from among the maximum transformation unit size and the current prediction unit size.

If a prediction mode of a current partition unit is an intra-mode, 'RootTuSize' may be determined by using Equation (7) below. 'PartitionSize' denotes the size of the current partition unit.

$$RootTuSize = \min(MaxTransformSize, PartitionSize) \quad (7)$$

That is, if the current prediction mode is the intra-mode, the transformation unit size 'RootTuSize' when the TU size flag is 0 may be a smaller value from among the maximum transformation unit size and the size of the current partition unit.

However, the current maximum transformation unit size 'RootTuSize' that varies according to the type of a prediction mode in a partition unit is just an embodiment, and a factor for determining the current maximum transformation unit size is not limited thereto.

According to the image encoding method based on coding units of a tree structure described above with reference to FIGS. 8 through 20, image data of a spatial domain is encoded in each of the coding units of the tree structure, and the image data of the spatial domain is reconstructed in a manner that decoding is performed on each largest coding unit according to the image decoding method based on the coding units of the tree structure, so that a video that is formed of pictures and picture sequences may be reconstructed. The reconstructed video may be reproduced by a reproducing apparatus, may be stored in a storage medium, or may be transmitted via a network.

An offset parameter may be signaled in units of pictures, slices, largest coding units, coding units of a tree structure, prediction units of a coding unit, or transformation units of a coding unit. For example, a largest coding unit having a minimum error with respect to an original block may be reconstructed by adjusting reconstructed sample values of the largest coding unit by using an offset value reconstructed on the basis of an offset parameter received in units of largest coding units.

The one or more embodiments may be written as computer programs and may be implemented in general-use digital computers that execute the programs by using a computer-readable recording medium. Examples of the non-transitory computer-readable recording medium include magnetic storage media (e.g., ROM, floppy disks, hard disks, etc.), optical recording media (e.g., CD-ROMs, or DVDs), etc.

In the present disclosure, at least some of the components expressed using the term "unit" may be embodied by hardware. The term "hardware" should be understood to include a processor. The processor may include a general-purpose single or multi-chip microprocessor (e.g., an ARM), a specially-designed microprocessor (e.g., a digital signal processor (DSP)), a microcontroller, a programmable gate array, etc. The processor may be also referred to as a CPU. At least some of the components expressed using the term "unit" may be a combination of processors (e.g., an ARM and a DSP).

The term "hardware" may also include a memory. The memory may be any electronic component capable of storing electronic information. The memory may include a random access memory (RAM), a read-only memory (ROM), a magnetic disc storage medium, an optical storage medium, a flash memory device included in an RAM, an on-board memory included in a processor, an EPROM an EEPROM, registers, other types of storage devices, or a combination thereof.

Data and a program may be stored in the memory. The program may be executed by a processor to implement the methods set forth herein. The execution of the program may include use of the data stored in the memory. When commands are executed by the processor, various parts of the commands may be loaded to the processor and various pieces of the data may be loaded to the processor.

While exemplary embodiments of the present disclosure have been described above, it will be understood by those of ordinary skill in the art that various changes in form and details may be made therein without departing from the spirit and scope of the present disclosure. The exemplary embodiments should be considered in descriptive sense only and not for purposes of limitation. Therefore, the scope of the present disclosure is defined not by the above description but by the appended claims, and all differences within the scope will be construed as being included in the present disclosure.

The invention claimed is:

1. A method of decoding a video, the method comprising:
   parsing an effect type flag indicating a type of an edge correction effect of a current block and an edge correction parameter from a bitstream, the edge correction parameter being used to correct a reconstructed pixel included in the current block;
   determining whether the reconstructed pixel is included in an edge region according to a first threshold value included in the edge correction parameter;
   when the reconstructed pixel is included in the edge region, determining whether the reconstructed pixel is to be corrected according to a second threshold value included in the edge correction parameter; and
   when the reconstructed pixel is to be corrected, compensating a sample value of the reconstructed pixel according to a third threshold value included in the edge correction parameter,
   wherein the compensating the sample value of the reconstructed pixel according to the third threshold value included in the edge correction parameter comprises compensating the sample value of the reconstructed pixel according to the third threshold value related to the parsed effect type flag.

2. The method of claim 1, wherein at least two values among the first threshold value, the second threshold value and the third threshold value are the same value.

3. The method of claim 1, wherein the parsing of the edge correction parameter from the bitstream comprises parsing the edge correction parameter from a slice segment header of the bitstream.

4. The method of claim 1, further comprising:
   parsing an edge correction flag indicating whether edge correction is to be performed on the current block; and
   parsing an effect type flag indicating a type of an edge correction effect of the current block, based on the parsed edge correction flag.

5. The method of claim 1, wherein, when the effect type flag indicates application of a smoothing effect to the current block, the sample value of the reconstructed pixel is compensated for to reduce a difference between the sample value of the reconstructed pixel and sample values of neighboring pixels of the reconstructed pixel.

6. The method of claim 1, wherein, when the effect type flag indicates application of a sharpening effect to the current block, the sample value of the reconstructed pixel is compensated for to increase a difference between the sample value of the reconstructed pixel and sample values of neighboring pixels of the reconstructed pixel.

7. The method of claim 1, wherein the determining of whether the reconstructed pixel is included in the edge region according to the first threshold value included in the edge correction parameter comprises determining that the reconstructed pixel is included in the edge region when a difference between the sample value of the reconstructed pixel and a sample value of at least one neighboring pixel of the reconstructed pixel is greater than or equal to the first threshold value.

8. The method of claim 1, wherein the determining of whether the reconstructed pixel is to be corrected according to the second threshold value included in the edge correction parameter comprises determining that the reconstructed pixel is to be corrected when a difference between the sample value of the reconstructed pixel and a mean of a sample value of at least one neighboring pixel of the reconstructed pixel is greater than or equal to the second threshold value.

9. The method of claim 1, wherein the compensating for the sample value of the reconstructed pixel according to the third threshold value included in the edge correction parameter comprises increasing or decreasing the sample value of the reconstructed pixel when a difference between the sample value of the reconstructed pixel and a mean of a sample value of at least one neighboring pixel of the reconstructed pixel is greater than or equal to the third threshold value.

10. The method of claim 1, wherein the edge correction parameter comprises at least one of:
   a parameter for a luma component; and
   a parameter for a chroma component.

11. An apparatus for decoding a video, the apparatus comprising at least one processor configured to:
parse an effect type flag indicating a type of an edge correction effect of a current block and an edge correction parameter from a bitstream, the edge correction parameter being used to correct a reconstructed pixel included in the current block; and
determine whether the reconstructed pixel is included in an edge region according to a first threshold value included in the edge correction parameter, determine whether the reconstructed pixel is to be corrected according to a second threshold value included in the edge correction parameter when the reconstructed pixel is included in the edge region, and compensate a sample value of the reconstructed pixel according to a third threshold value included in the edge correction parameter when the reconstructed pixel is to be corrected,
wherein the at least one processor is configured to compensate the sample value of the reconstructed pixel according to the third threshold value related to the parsed effect type flag.

12. The apparatus of claim 11, wherein at least two values among the first threshold value, the second threshold value and the third threshold value are the same value.

13. The apparatus of claim 11, wherein the at least one processor is further configured to parse an edge correction flag indicating whether edge correction is to be performed on the current block, and parse an effect type flag indicating a type of an edge correction effect of the current block, based on the parsed edge correction flag.

14. The apparatus of claim 11, wherein, when whether the reconstructed pixel is included in the edge region is determined according to the first threshold value included in the edge correction parameter, the at least one processor is further configured to determine that the reconstructed pixel is included in the edge region when a difference between the sample value of the reconstructed pixel and a sample value of at least one neighboring pixel of the reconstructed pixel is greater than or equal to the first threshold value.

15. The apparatus of claim 11, wherein, when whether the reconstructed pixel is to be corrected is determined according to the second threshold value included in the edge correction parameter, the at least one processor is further configured to determine that the reconstructed pixel is to be corrected when a difference between the sample value of the reconstructed pixel and a mean of a sample value of at least one neighboring pixel of the reconstructed pixel is greater than or equal to the second threshold value.

16. The apparatus of claim 11, wherein, when the sample value of the reconstructed pixel is compensated for according to the third threshold value included in the edge correction parameter, the sample value of the reconstructed pixel is increased or decreased when a difference between the sample value of the reconstructed pixel and a mean of a sample value of at least one neighboring pixel of the reconstructed pixel is greater than or equal to the third threshold value.

17. A method of encoding a video, the method comprising:
determining an effect type flag indicating a type of an edge correction effect of a current block and an edge correction parameter for correcting a reconstructed pixel included in the current block;
determining whether the reconstructed pixel is included in an edge region according to a first threshold value included in the edge correction parameter;
when the reconstructed pixel is included in the edge region, determining whether the reconstructed pixel is to be corrected according to a second threshold value included in the edge correction parameter; and
when the reconstructed pixel is to be corrected, compensating a sample value of the reconstructed pixel according to a third threshold value included in the edge correction parameter,
wherein the compensating the sample value of the reconstructed pixel according to the third threshold value comprises compensating the sample value of the reconstructed pixel according to the third threshold value related to the determined effect type flag.

18. A computer readable recording medium having recorded thereon a computer program for implementing the method of claim 1.

\* \* \* \* \*